United States Patent
Ali et al.

(10) Patent No.: US 11,552,816 B2
(45) Date of Patent: Jan. 10, 2023

(54) TARGETED POSITIONING OF MESSAGE CONTENT FOR INTERFACES IDENTIFYING MULTIPLE USERS

(71) Applicant: MICROSOFT TECHNOLOGY LICENSING, LLC, Redmond, WA (US)

(72) Inventors: Bahram Ali, Belllevue, WA (US); Fehmi Chebil, San Jose, CA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 17/337,401

(22) Filed: Jun. 2, 2021

(65) Prior Publication Data

US 2022/0393900 A1 Dec. 8, 2022

(51) Int. Cl.
*H04L 12/18* (2006.01)

(52) U.S. Cl.
CPC ........ *H04L 12/1859* (2013.01); *H04L 12/184* (2013.01); *H04L 12/185* (2013.01); *H04L 12/1854* (2013.01)

(58) Field of Classification Search
CPC . H04L 12/1859; H04L 12/184; H04L 12/185; H04L 12/1854
See application file for complete search history.

(56) References Cited

U.S. PATENT DOCUMENTS

| | | | |
|---|---|---|---|
| 8,701,020 B1 | 4/2014 | Fulcher | |
| 9,521,170 B2 | 12/2016 | Bader-natal et al. | |
| 10,061,467 B2 | 8/2018 | Brunsch et al. | |
| 10,171,386 B1* | 1/2019 | Pendap | G06F 3/0481 |
| 2006/0031779 A1* | 2/2006 | Theurer | G06F 3/1454 |
| | | | 715/781 |
| 2013/0204888 A1 | 8/2013 | Guzman et al. | |
| 2016/0057175 A1 | 2/2016 | Chen et al. | |

(Continued)

OTHER PUBLICATIONS

"Display a Chat Box in Your Stream", Retrieved from: https://web.archive.org/web/20210212053756/https:/restream.io/chat/, Feb. 12, 2021, 5 Pages.

(Continued)

*Primary Examiner* — Mohamed A. Wasel
(74) *Attorney, Agent, or Firm* — Scott Y. Shigeta; Newport IP, LLC

(57) ABSTRACT

The techniques disclosed herein provide a system that can generate targeted positioning of message content for multi-user communication interfaces. In some configurations a system may generate a user interface that displays a number of video stream renderings, wherein individual video stream renderings, e.g., thumbnail views, show a participant of a communication session. When one of the participants sends the user a private message, the system renders at least a portion of the private message in a semi-transparent format as an overlay on the video rendering of the sender. This allows a traditional video stream interface to also function as an organizer for private messages sent to a particular user. This user interface format allows a user to readily identify a broader perspective of chat activity without requiring a user to enter specific chat user interfaces or provide a number of manual input entries to view the private chat content.

20 Claims, 23 Drawing Sheets

(56) References Cited

U.S. PATENT DOCUMENTS

| | | |
|---|---|---|
| 2016/0072741 A1 | 3/2016 | Hamilton et al. |
| 2017/0099456 A1 | 4/2017 | Tang et al. |
| 2018/0034763 A1 | 2/2018 | Rincon Ferrera et al. |
| 2019/0347114 A1 | 11/2019 | Gurtin et al. |
| 2020/0371673 A1 | 11/2020 | Faulkner |

OTHER PUBLICATIONS

Ghani, Uzair, "Enable Classic Magnification Effect for Dock Icons in macOS", Retrieved from: https://wccftech.com/how-to-enable-classic-magnification-effect-for-dock-icons-in-macos-tutorial/, Jan. 15, 2020, 5 Pages.

"International Search Report & Written Opinion issued in PCT Application No. PCT/US22/027968", dated Aug. 31, 2022, 13 Pages.

\* cited by examiner

TARGETED POSITIONING OF MESSAGE CONTENT FOR INTERFACES IDENTIFYING MULTIPLE USERS

BACKGROUND

There are a number of different types of collaborative systems that allow users to communicate. For example, some systems allow people to collaborate by sharing meeting chat messages, group chat messages, emails, etc. Some systems allow messages to be sent while a specific group of users are sharing live video streams. Although these systems can be useful for allowing users to coordinate and share ideas, some existing systems have a number of drawbacks. For instance, some systems do not organize messages in a way that allows users to optimally view each message without requiring a number of user inputs. Such a scenario may make it difficult for a presenter to see each message since that user may be required to open a specific user interface that is different than a user interface that may be used to view shared content, such as a presentation slide deck.

Some traditional user interface designs and user input mechanisms for collaboration applications have a number of shortcomings. For example, some traditional collaboration user interfaces do not allow users to readily view private chat sessions while they are participating in large group meetings. This may be particularly difficult for a user who may be presenting information to a large group of people. In some cases, a user may be required to take a number of manual steps to open separate user interfaces to view their private chat sessions during a group meeting. They may even have to open a separate user interface for each private message they receive from each user. This can create a number of inefficiencies and greatly detract from a user's focus on a meeting as they have to select a separate UI for each chat session, and then perform a number of manual steps to close each chat session to view other chat sessions or return to a main user interface displaying shared meeting content. Such inefficiencies can lead to scenarios where it is nearly impossible for a user to gain a broader context to all of their private chat messages, particularly in a situation where the user is engaged in dozens of private chat sessions while participating in large meetings that involve hundreds or thousands of participants. Such challenges can be exacerbated when a user is also tasked with presenting information to an audience.

SUMMARY

The techniques disclosed herein address the above-referenced shortcomings and other technical issues by providing a system that can generate targeted positioning of message content for multi-user interfaces. In some configurations a system may generate a user interface that displays a number of video stream renderings, e.g., thumbnail views, that each show a participant of a communication session. Some configurations can also provide an identifier for each participant. When one of the participants sends a private message, the system renders at least a portion of the private message in a semi-transparent format as an overlay on the video rendering or identifier of the sender. This allows a traditional video stream interface to also function as an organizer for private messages sent to a particular user. This user interface format also allows a user to readily identify a broader perspective of chat activity without requiring a user to enter specific chat user interfaces or provide a number of manual input entries to view the private chat content. Also, this user interface format allows a user to readily view a rate of activity for each private chat from a high level. This feature of providing a broader context cannot be provided by traditional designs. The system can also generate graphical variations to certain types of content to further mitigate the chances a user will miss salient information.

In some configurations, eye-gaze input gestures can allow the user to readily view more detailed views of content of private chat sessions during a group meeting. In the example user interface that includes an overlay of private chat content over thumbnails of individuals related to each chat, a recipient of messages can cause a system to display more detailed views of the chat content by the use of eye-gaze gestures. Keywords or phrases may be emphasized or enlarged based on the eye gesture. Certain eye-gaze gestures can also cause a display of a priority of the chat content, a person's role, or other contextual information. The user can control the size of a private chat preview or open a private chat UI by the use of eye-gaze gestures. This allows the user to focus on other tasks, which may include presenting content in a multi-user communication session, while also allowing the user to view and control private chat windows and previews of private chat content.

The techniques disclosed herein can provide a number of technical benefits. For instance, by providing targeted positioning of message content for multi-user communication interfaces and eye-gaze controls for controlling characteristics of the message content, a computing device can effectively display information in a format that can allow a granular level of control of how content is organized and emphasized to a consumer of the content. When information is organized more accurately a user is less likely to miss salient information. Such benefits can increase the efficiency of a computing system by reducing the number of times a user needs to interact with a computing device to obtain information, e.g., prolonging meetings, retrieving meeting recordings, requesting duplicate copies of previously shared content, etc. Thus, various computing resources such as network resources, memory resources, and processing resources can be reduced.

The above-referenced efficiencies created by a system providing targeted positioning of message content can also lead to additional efficiencies. In particular, by displaying messages in targeted areas and allowing a consumer of that information to provide eye-gaze controls for changing display characteristics, a system can reduce the number of times a user needs to interact with a computing device to obtain any missed information or information that may be hidden in a separate user interface. This can lead to the reduction of manual data entry that needs to be performed by a user. By reducing the need for manual entry, inadvertent inputs and human error can be reduced. This can ultimately lead to more efficient use of computing resources such as memory usage, network usage, processing resources, etc.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1A:
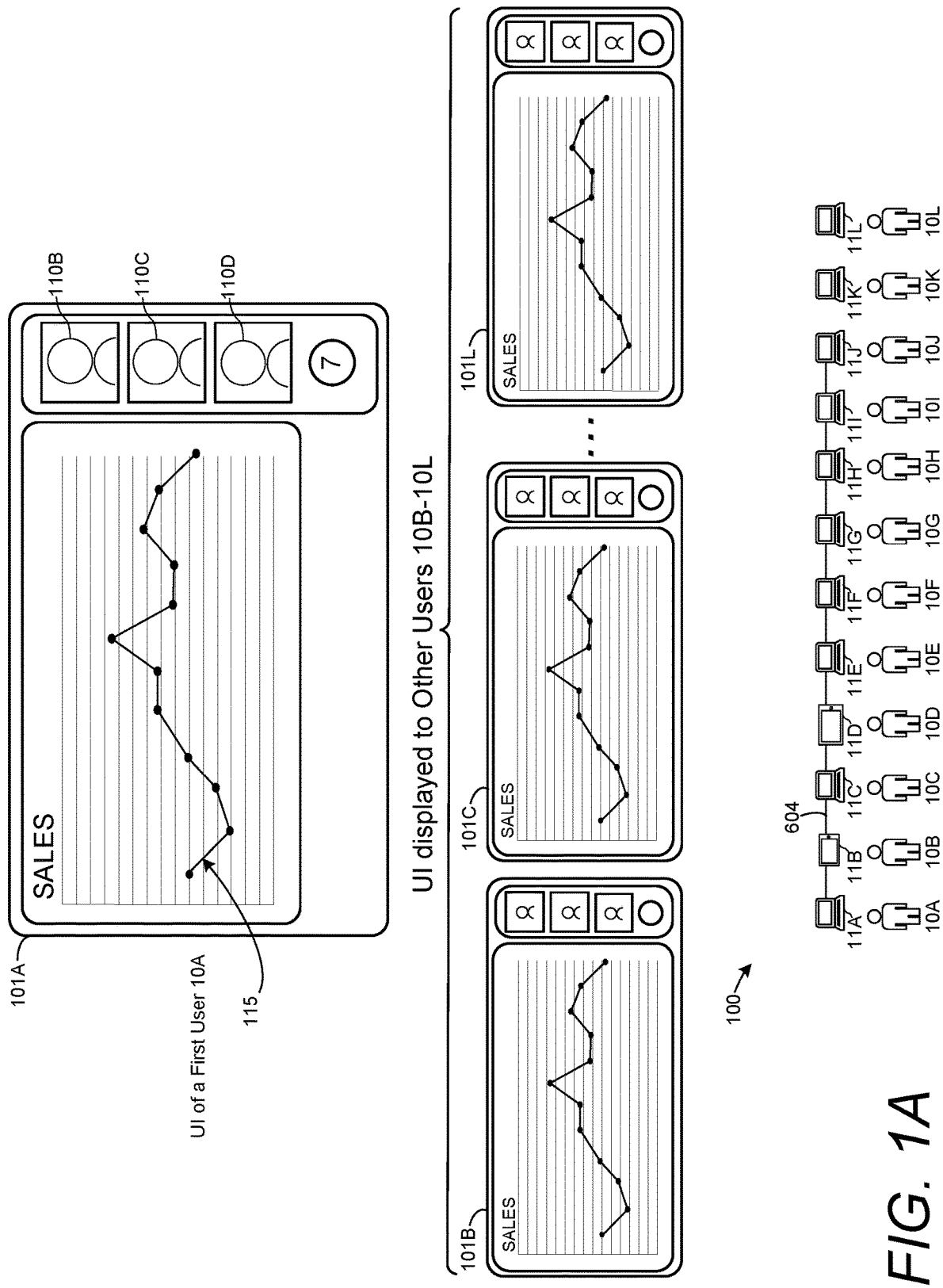
FIG. 1A shows example user interfaces and a block diagram of a system for generating targeted positioning of message content for multi-user communication interfaces.

The techniques disclosed herein can provide a number of technical benefits. For instance, by providing targeted positioning of message content for multi-user communication interfaces and eye-gaze controls for controlling characteristics of the message content, a computing device can effectively display information in a format that can allow a granular level of control of how content is organized and emphasized to a consumer of the content. When information is organized more accurately a user is less likely to miss salient information. Such benefits can increase the efficiency of a computing system by reducing the number of times a user needs to interact with a computing device to obtain information, e.g., prolonging meetings, retrieving meeting recordings, requesting duplicate copies of previously shared content, etc. Thus, various computing resources such as network resources, memory resources, and processing resources can be reduced.

The above-referenced efficiencies created by a system providing targeted positioning of message content can also lead to additional efficiencies. In particular, by displaying messages in targeted areas and allowing a consumer of that information to provide eye-gaze controls for changing display characteristics, a system can reduce the number of times a user needs to interact with a computing device to obtain any missed information or information that may be hidden in a separate user interface. This can lead to the reduction of manual data entry that needs to be performed by a user. By reducing the need for manual entry, inadvertent inputs and human error can be reduced. This can ultimately lead to more efficient use of computing resources such as memory usage, network usage, processing resources, etc.

In addition, by having a system configured to control permissions for the communication of messages can also provide a number of other benefits other than added security and process flow. For instance, reducing the need for human interaction, or improving human interaction with the computer, a system can mitigate user fatigue and promote user engagement. To that end, participants of a communication session are less likely to miss salient information and reduce the need for users to refer to recordings, alternative communication methods, or prolong meetings, all of which can lead to inefficient use of computing resources. The benefits of the techniques disclosed herein can also mitigate the need for redundant use of network, processor, memory, or other computing resources.

These technical benefits can also reduce the likelihood of inadvertent user inputs and other errors that may result when a user has to attend to user permissions and thus may miss salient information during a meeting. When users are distracted from an online event, they are required to review recordings or communicate with others when salient information is missed. When a participant of a video conference misses salient information due to a lack of user engagement, a system may be required to retrieve, communicate, and process multiple copies of information.

Referring now to FIG. 1A, aspects of a system 100 are shown and described below. In some configurations, the system 100 can comprise a plurality of computing devices 11A-11L respectively associated with a number of users 10A-10L. Some of the computing devices 11A-11J can be configured to communicate through a network or be interconnected using a communication session 604. The communication session 604 may be in the form of a meeting, a multi-user collaboration session, a video broadcast, etc. As described in more detail below, a communication session can be facilitated by a remote server or the communication session can be facilitated by any of the computing devices 11A-11J utilizing a peer-to-peer configuration. Live and recorded video streams can be shared over a communication session 604 along with additional content, such as word documents, slide decks, chat messages, and images.

Each computing device 11 can generate a user interface 101 each displaying shared content along with live video streams thumbnails or still image thumbnails of each participant. The thumbnails may be arranged according to various factors, including the most active speaker, a current presenter, priority of shared content, priority of a user title, etc. Other graphical elements can indicate a number of participants of a meeting. For example, an overflow element, e.g., displaying a 7, shows a number of people that are participating in a meeting in addition to those who are displayed in the thumbnail previews.

In the scenario shown in FIG. 1A, a first user 10A is operating a first computing device 11A, and is in a role as a presenter, who is controlling content 115, e.g., the SALES line graph, to be shared with a number of participants 10B-10J of a communication session 604. A subset of the computing devices, such as the eleventh computing device 11K and the twelfth computing device 11L, are not participating in the communication session, e.g., these users 10K and 10L are not part of the meeting, but these respective devices may be able to communicate to the other computing devices 10A-10J by sending private chat messages, emails, etc.

In this example, the first user is presenting content 115 and sharing a rendering of that content with other computing devices 10A-10J. The system is configured to allow a set of the other users, e.g., the second user 10B through the tenth user 10J, to send private messages to the first user 10A. By the use of the system and permission data, shown in FIG. 2, another user sends a private message to the first user. In this example, the second user 10B sends a message from the second computer 11B to the first user 10A at the first computer 11A. In response, the computer 11A of the first user displays the private message by overlaying the message over a video stream/icon of the sending member. In some embodiments, this can be done while suppressing other public messages directed to the entire group or private message from outside the group from displaying to the presenter.

Figure 1B:
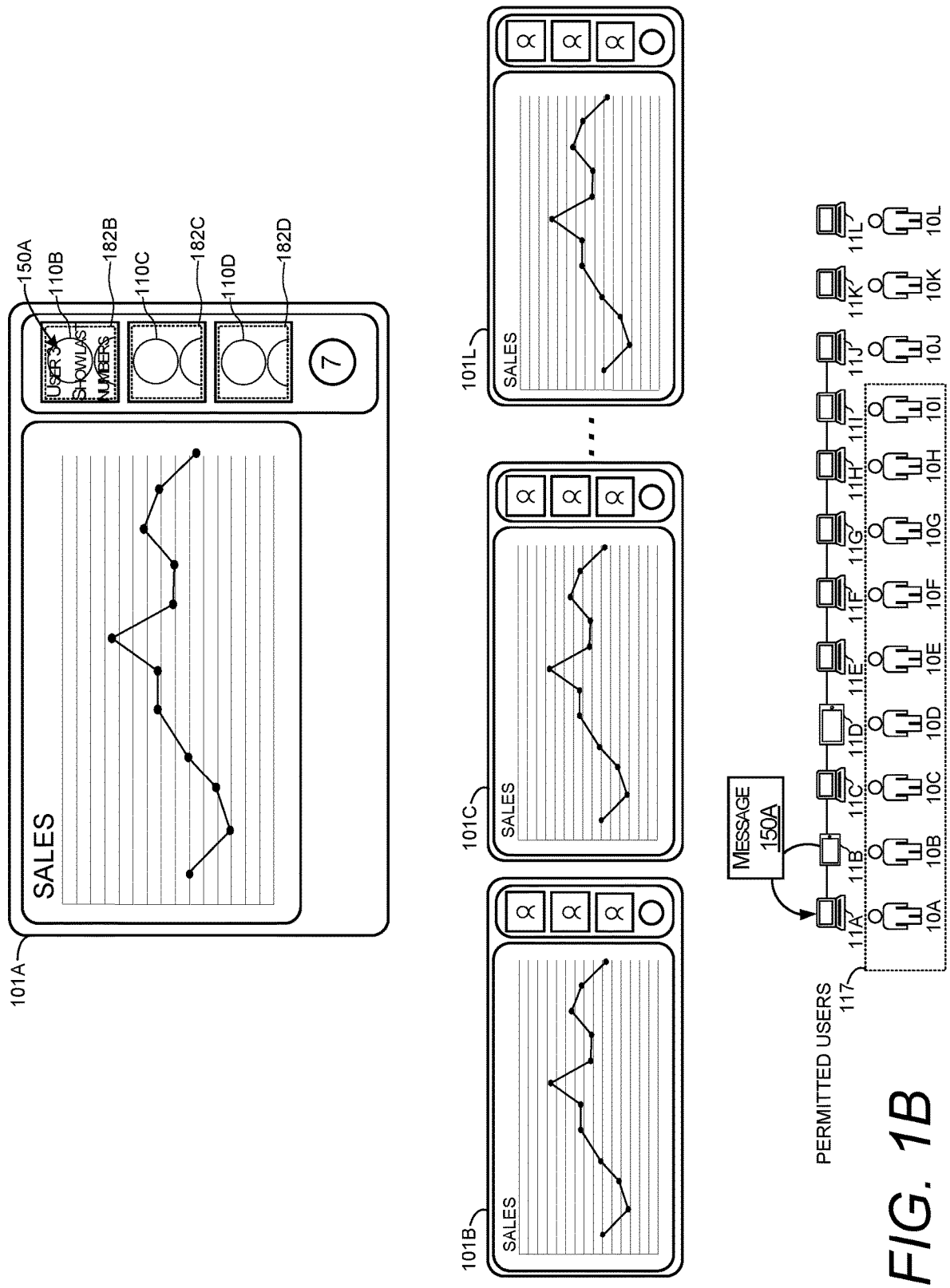
FIG. 1B shows an example user interface displaying a rendering of a first message that is positioned over a rendering of an author of the first message.

As shown in FIG. 1A, a method for controlling positions of messages 150 communicated to a user 10A of a communication system 100 can include causing a display of a user interface 101A comprising a rendering of shared content 115 and a display of a plurality of image renderings 110 each representing individual participants 10 of the communication system 100. As shown in FIG. 1B, the system 100 can receive a message 150A from a client computer 11B associated with an individual participant, the second user 10B. The message can be received at the first computer 11A and originated from the second computer 11B.

Figure 2:
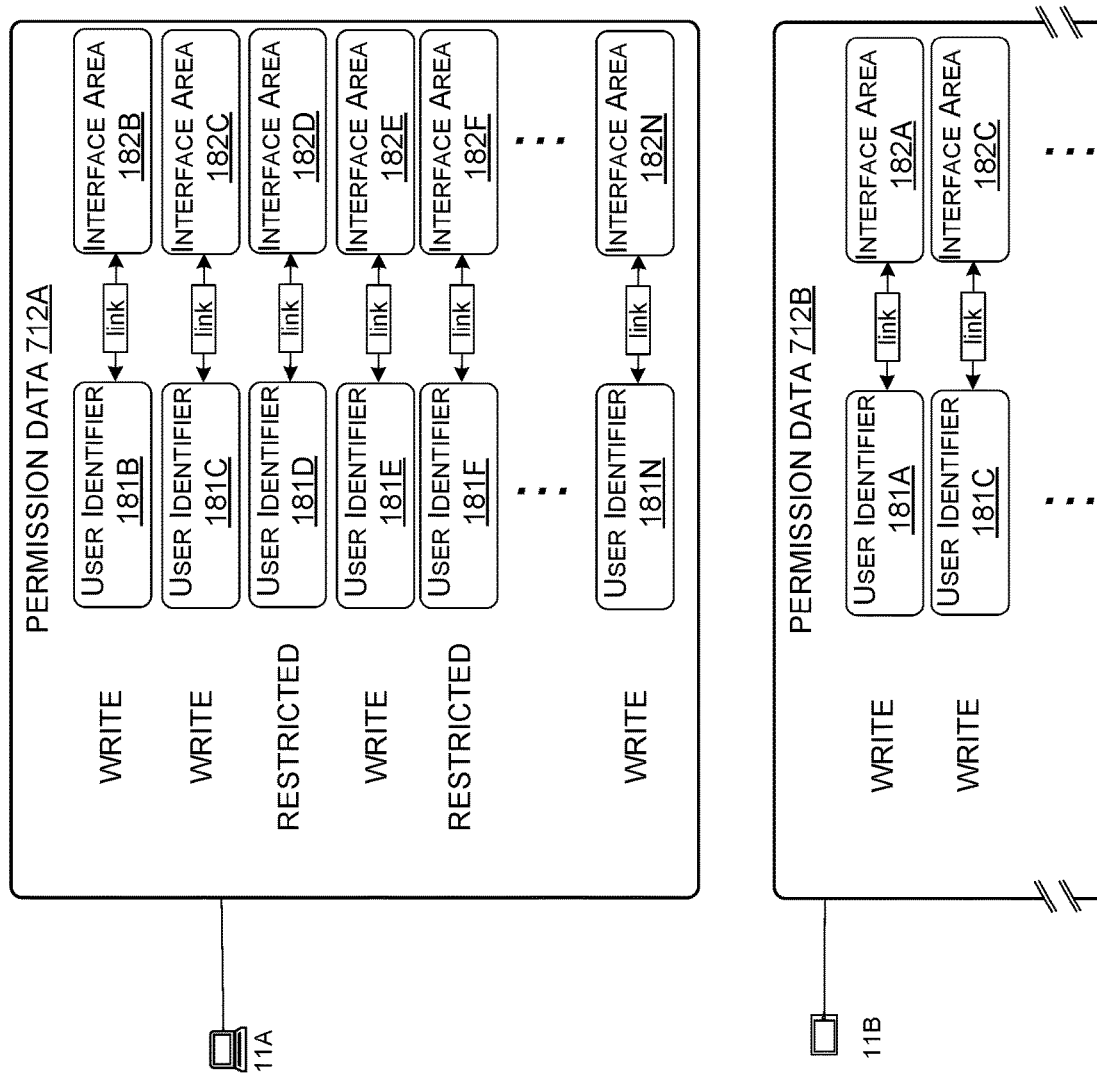
FIG. 2 is a block diagram of a data structure defining display associations and permissions for enabling a system to generate targeted positioning of message content for multi-user communication interfaces.

In response to receiving a message, the system can process permission data to select an interface area for displaying at least a portion of the received message 115. An example of permission data is shown in FIG. 2. In this example, each computing device is associated with individual instances of permission data 712. For instance, the first computer 11A is associated with a first set of permissions 712A, the second computer 11B is associated with a second set of permissions 712B, etc.

The first set of permissions 712A may be accessible by the first computer 11A. The first set of permissions 712A can associate user identities 181, and thus incoming messages associated with those identities, with an area 182, e.g., a position or defined boundary, within a user interface 101. Boundaries can include coordinates of user interface, which may define a particular area where a thumbnail preview is located. For instance, in the first entry of the permission data 712A, the user identifier 181B for the second user is linked to an interface area 182B. That interface area 182B may be defined by coordinates that coincide with a rendering of the second user on the first user interface 101A shown in FIG. 1B. This enables the message to be displayed as an overlay over a rendering of the user or over a rendering that represents source of the message.

The permission data 712 can also have an attribute, e.g., write or restricted, defining a permission for a particular user. For the first user at the first computer, the permission data 712A, can cause a message to be suppressed from display or restricted from display if the message is received from a user that does not have write capabilities. In this example of the permission data 712A for the first user, other users that have "write" permissions are also referred to herein as permitted users, can send message to the first user and the message are displayed on the thumbnail. Non-permitted users, e.g., users having a "restricted" permission setting do not have rights to send messages to the first user.

In some embodiments, permission data may allow non-permitted users to send a message to the first user, however, the restriction or suppression may only apply to the display of the message as an overlay on the first user interface over the thumbnail preview. In such an instance, the message can be redirected to a private chat user interface, such as the updated user interface 101A' shown in FIG. 7E while the system restricts or suppresses the display of the message on the main meeting user interface 101A shown in FIG. 1B. This embodiment allows a user, such as the first user to receive messages but the restriction may prevent that message from being displayed during a presentation. Thus, restricted users that send a message to the will be prevented from causing a display of messages to the defined area 182 while other users that have write permissions can cause a display of their messages within the defined area 182. Such permissions can be also associated with a particular timeline or a portion of an event. For instance, a person may have a particular set of permissions for sending a message to another individual during a portion, such as a presentation, of an event.

With reference to FIG. 1B, for users meeting the one or more criteria defined herein, the system can cause a display of the rendering of the message 150A within the interface area 182B that comprises the image rendering 110B representative of the individual participant 10B that sent the message. This interface area 182B being selected from a number of interface areas based on the permission data associating each interface area with individual users or individual sources of messages sent to the first user. In other words, the selected interface area 182B can be selected from a plurality of interface areas 182 using the permission data 712A indicating that the interface area 182B is reserved for a display of a rendering of the message 150A originating from the remote computer 11B associated with the individual participant 10B. The association shown in FIG. 2 can also cause the computer to display a message that is exclusively directed to the computing device 11A associated with the recipient, e.g., the first user 10A. The other sets of permissions, e.g., the second set of permissions 712B can be used by the second computer 11B for messages sent to the second user.

In some embodiments, when the permission data indicates that an interface area 182B is reserved for a display of a rendering of the message 150A, a computer can restrict any other message from any other user, other than a designated author, from being displayed in that interface area. In addition, messages from that designated author can only be displayed within that interface area, such as the second interface area 182B.

Figure 3A:
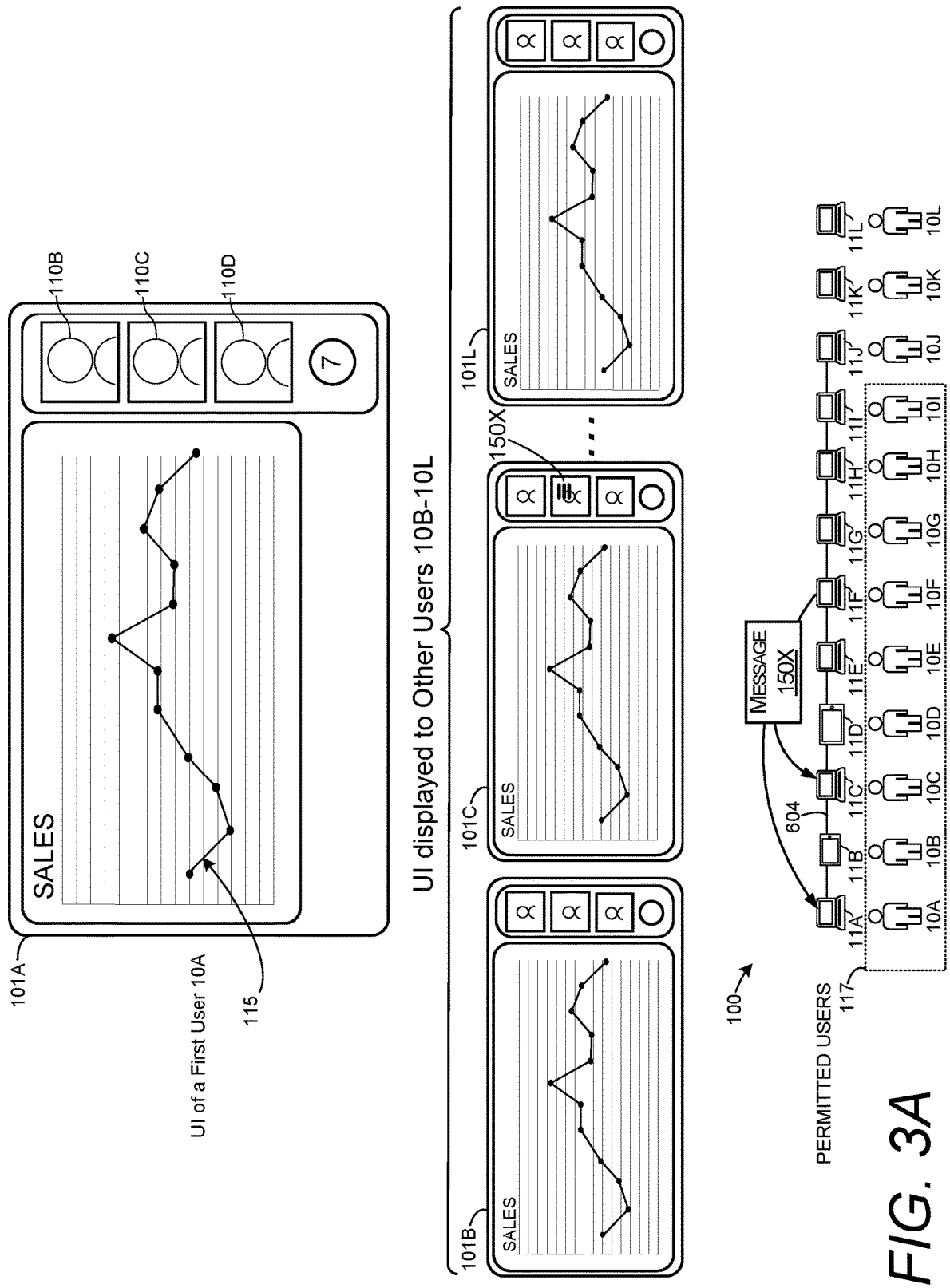
FIG. 3A shows an example user interface displaying the state of a user interface that suppresses the display of a message that is sent to two or more participants.

In some configurations, the permissions can be used to restrict other types of messages from other types of users. For instance, as shown in FIG. 3A, the permission data 712A can cause the computing device 11A associated with the recipient, e.g., the first user 10A, to suppress the display of group messages 150X directed to the recipient, e.g., the first user 10A, and other participants of the plurality of participants. Thus, even if a permitted user sends a group message 150X to the first user, the system can suppress the display of the message on the first user interface as an overlay over the sender's thumbnail preview since the message has multiple recipients. Thus, in some embodiments, the system can only allow private messages single recipient displayed as overlay over the thumbnail preview. In some embodiments, suppression of the message sent to the first user and at least one other recipient can mean that the message may be received by the first computer and displayed on another user interface but not displayed as an overlay over the sender's thumbnail preview on the first user interface 101A. In this example, a rendering the group message 150X is shown in the user interface of the third user. This display can be based on the permissions and other factors, such as a role of each person, a domain of each user, a company affiliation, team affiliation, etc. For instance, if the first user is a presenter and the third user is an audience member, the system may suppress the display of the message on the presenter's user interface 101A, but not suppress the display of the message on the audience member's user interface 101C.

Figure 3B:
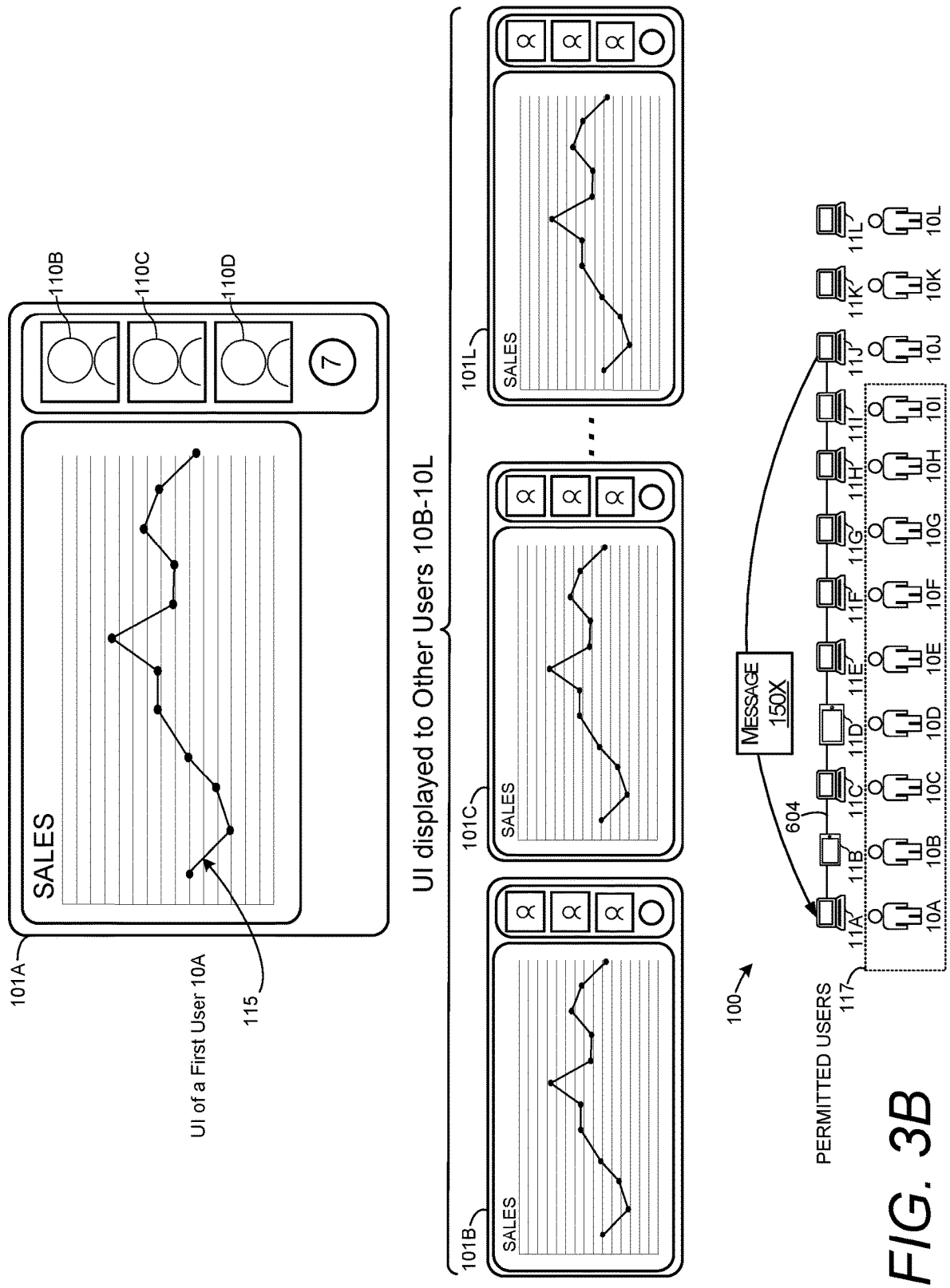
FIG. 3B shows an example user interface displaying the state of a user interface that suppresses the display of a message that is sent from a person that is outside of a group of permitted users.

In another example, as shown in FIG. 3B, the permission data 712A can cause the computing device 11A associated with the recipient, e.g., the first user 10A, to also suppress the display of private messages originating from one or more participants that are not designated as permitted participants. This can mean that users having restricted rights are not permitted participants and users with write permissions are permitted participants. In some embodiments, suppression of the message sent from a non-permitted user can mean that the message may be received by the first computer and displayed on another user interface but not displayed as an overlay over the sender's thumbnail preview on the first user interface 101A.

The permitted users 117 can be defined by any user having permissions, such as an administrator. The permitted users can be defined by any user having a predetermined role within a meeting, such as a presenter. In some configurations, the permissions can also cause the system to suppress the display of a message or restricted delivery of a message that comes from a user that is not participating in the communication session, such as user 10K or 10L. In some embodiments, suppression of a message can also restrict a computer from receiving or displaying the message. Thus, in the example of FIG. 1B, suppression of the message can also mean that the first computer 11A is restricted from receiving the message 150A.

The permitted users can be selected based on one or more factors. In some configurations, the permitted users, e.g., users having write permissions, can be established by an input from a designated user, such as a presenter. The input data can identify permitted users who can be allowed to communicate messages to a particular user, such as the first user 10A. This may occur in the scenario, for example, where the first user 10A is a presenter of the meeting or otherwise holds a predetermined role such as a director, coordinator, or a preferred audience member. The first user 10A can provide input data to identify the permitted users. In addition, other input data, such as a directory of email addresses or other identifiers can be used to identify the permitted users. The permitted users can be, for example, on the same team, company, or entity as the first user 10A. In one specific example, permitted users can include users that are associated with an email address having the same domain as a presenter of a meeting.

The input data can also identify other users of the number of users who are to be restricted from communicating messages to the first user, e.g., a presenter, during a portion of an event, like a presentation. The other users, also referred to herein as, restricted users or non-permitted users, may include people who are not on the same team, company or entity as the first user 10A. Referencing the above example, non-permitted users can include users that are associated with an email address that does not have the same domain as the presenter.

In response to the input data, the system can configure permission data for allowing the permitted users 117 to exclusively communicate individual messages to a computing device 11A associated with a predetermined user, such as the first user 10A, who may be designated as having a predetermined role such as a presenter for at least a portion of an event. The system may also configure the permission data to restrict the other users from communicating messages to the presenter during the presentation.

Figure 4A:
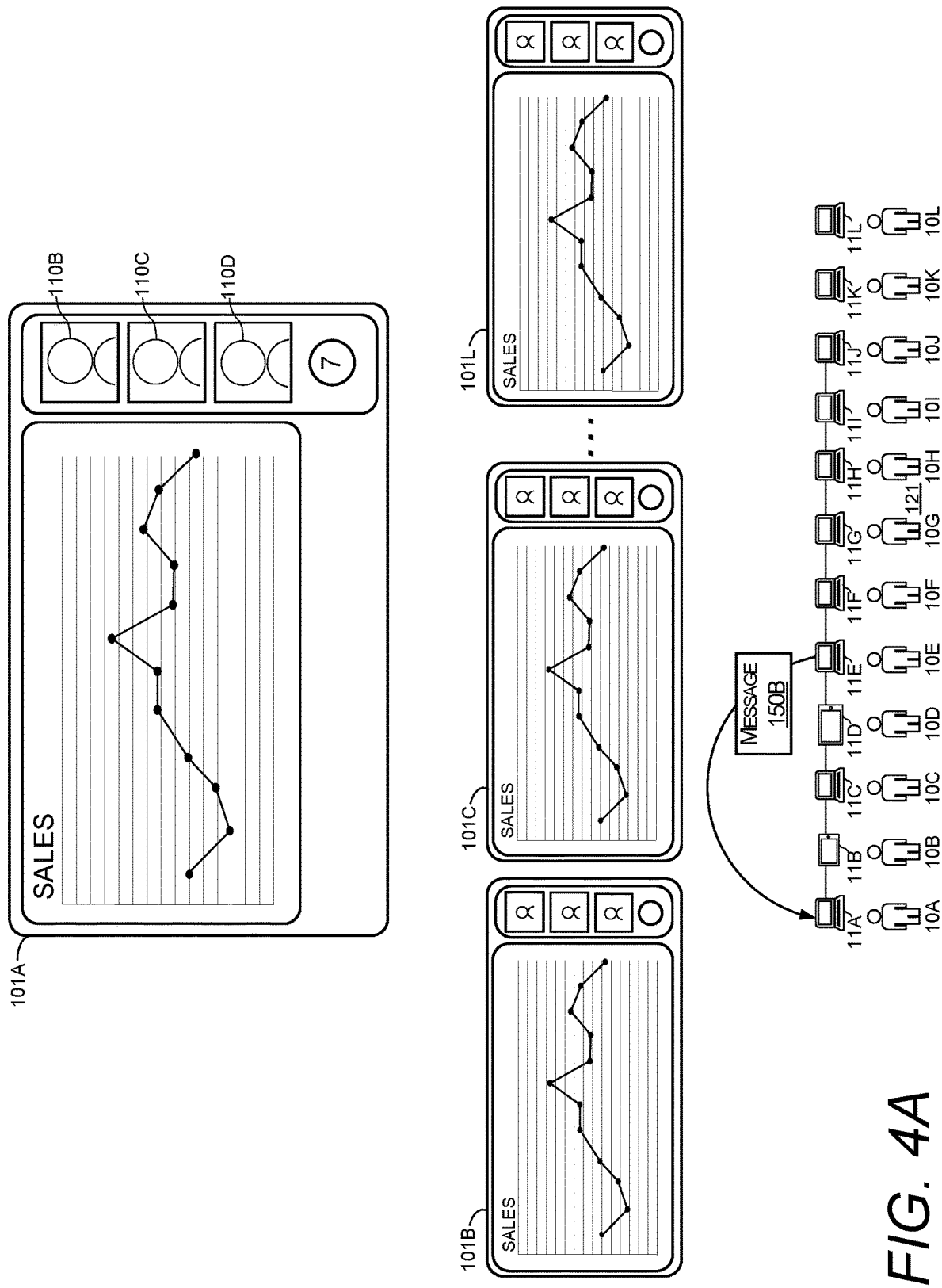
FIG. 4A is an example user interface displaying a first stage of a process where message is displayed in a thumbnail preview of an individual that sent the message.
Figure 4B:
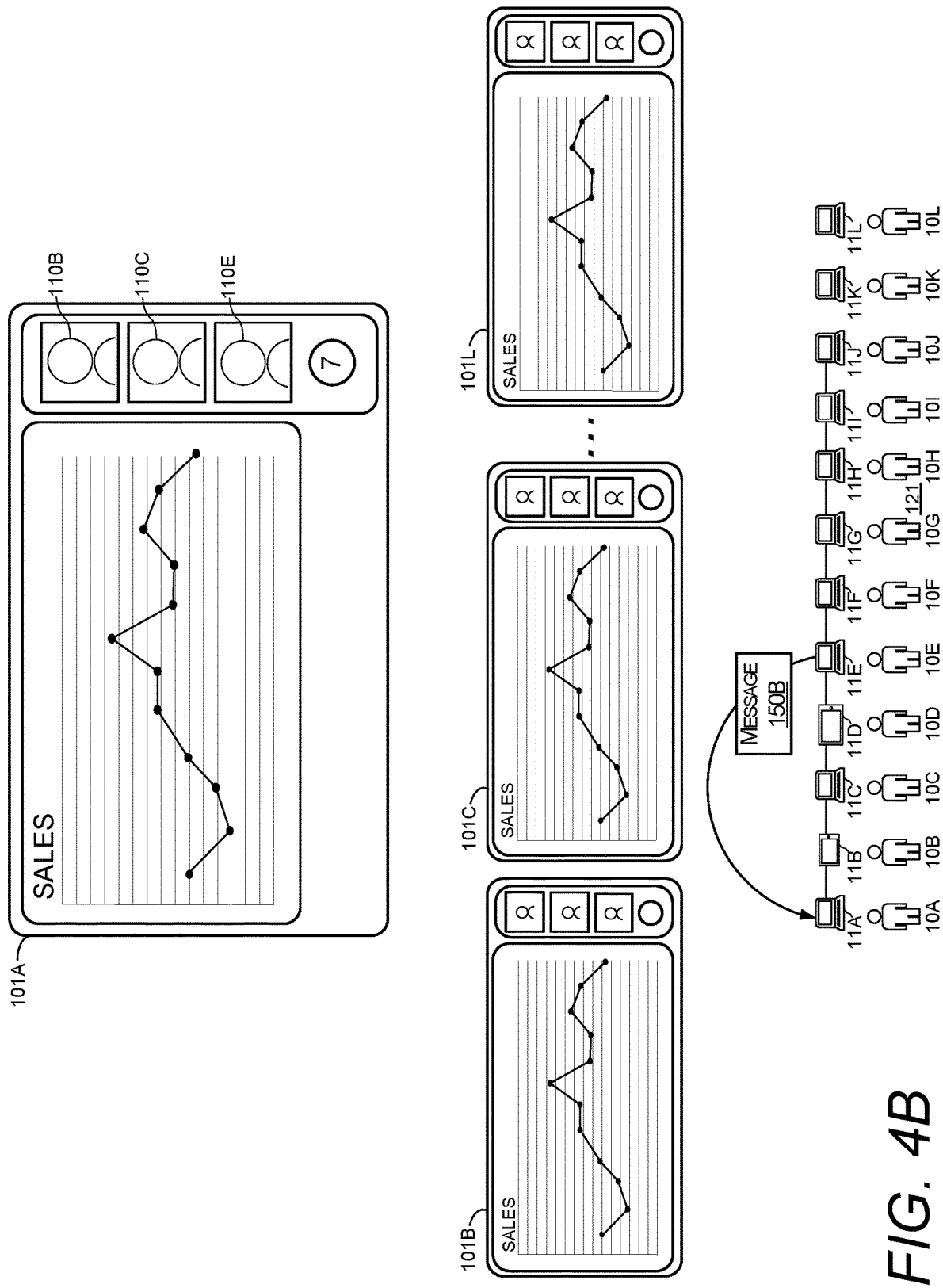
FIG. 4B is an example user interface displaying a second stage of a process where a message is displayed in a thumbnail preview of an individual that sent the message stage, where the thumbnail transitions into a viewing area in response to receiving the message.
Figure 4C:
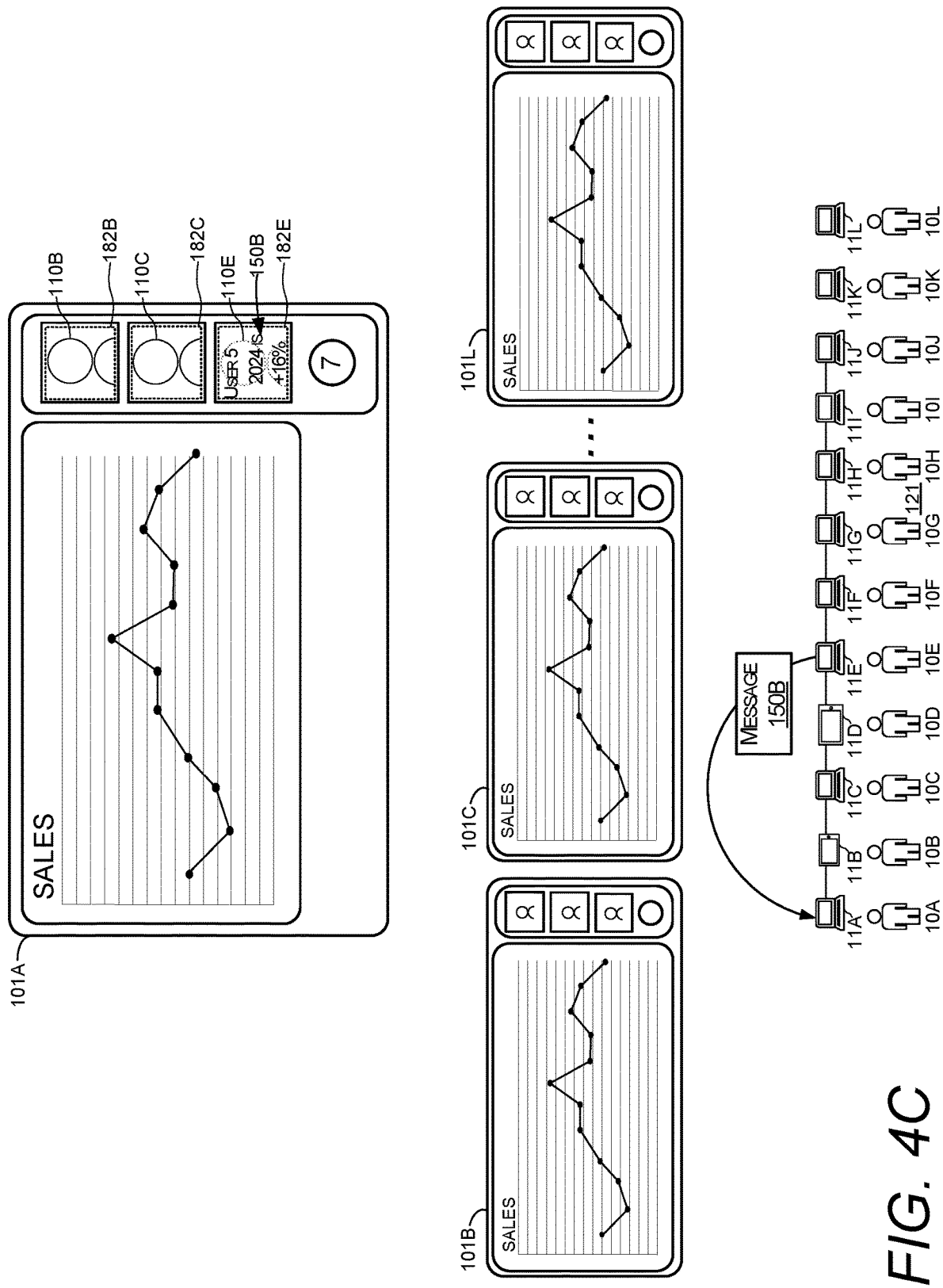
FIG. 4C is an example user interface displaying a third stage of a process where a message is displayed in a thumbnail preview of an individual that sent the message stage.

FIGS. 4A-4C show aspects of an embodiment where a user interface can undergo transformations to rearrange the display of thumbnail previews in response to receiving a message. Generally described, in FIG. 4A, the user interface 101A displays a number of thumbnail previews for the second user 10B, the third user 10C, and the fourth user 10D. The other participants are represented by an overflow interface element that indicates the number of other participants. When one of the other participants, e.g., the fifth user 10E, sends a message 150B from the fifth computing device 11E, the system can rearrange the thumbnail previews to display a thumbnail preview of the user that sent the message. As shown in FIG. 4B, in response to fifth user 10E sending the message 150B, the user interface transitions to a format that includes the thumbnail previews (110B, 110C, and 110E) for the second user 10B, the third user 10C, and the fifth user 10E. In addition, the system can update the permission data to associate an interface area with the fifth user. In this example, a data structure can associate the interface area 182E shown in FIG. 4C with an identity of the fifth user 10E. Then, as shown in FIG. 4C, using the permission data and the identity of the fifth user to identify the display area 182E, the system can display the message 150B that was sent from the fifth user 10E as an overlay on the interface area 182E. As shown, at least a portion of the message 150B, e.g., "2024 is +16%" is displayed within the interface area 182E of the user interface 101A. In some embodiments, a user identity of the message author or message source, e.g., "User 5," is also displayed within the interface area 182E of the user interface 101A.

In some configurations, the position of a thumbnail preview and an associated message can be based on a priority of a user associated with the message or based on a priority of the message. In some configurations, a priority of a user can be based on an activity level of a participant. An activity level can include any type of computer-related action, such as a rate of speaking, a rate or number of gestures, or a number of messages that are sent to other users. In one example, a position of a thumbnail preview of a particular user can be based on a number of messages that are sent from that particular user to the presenter.

In the example shown in FIGS. 4A-4C, the fifth user and/or the message sent by the fifth user is at a priority that does not meet one or more thresholds. Thus, the position of the thumbnail preview is in a less prominent location than the thumbnail previews of the other users. In this example, such priorities can result from the fifth user and/or message sent by the fifth user having a priority that is lower than the second user, the third user, and/or messages of the second user or the third user. Specifically, the rendering 110B of the second user 10B and the rendering 110C of the third user 10C are at a higher position, or in a more prominent location, than the fifth user 10E. The transition from the user interface arrangement of FIG. 4A to the user interface arrangement of FIG. 4B can result in response to a receipt of a message from the fifth user 10E.

Figure 5A:
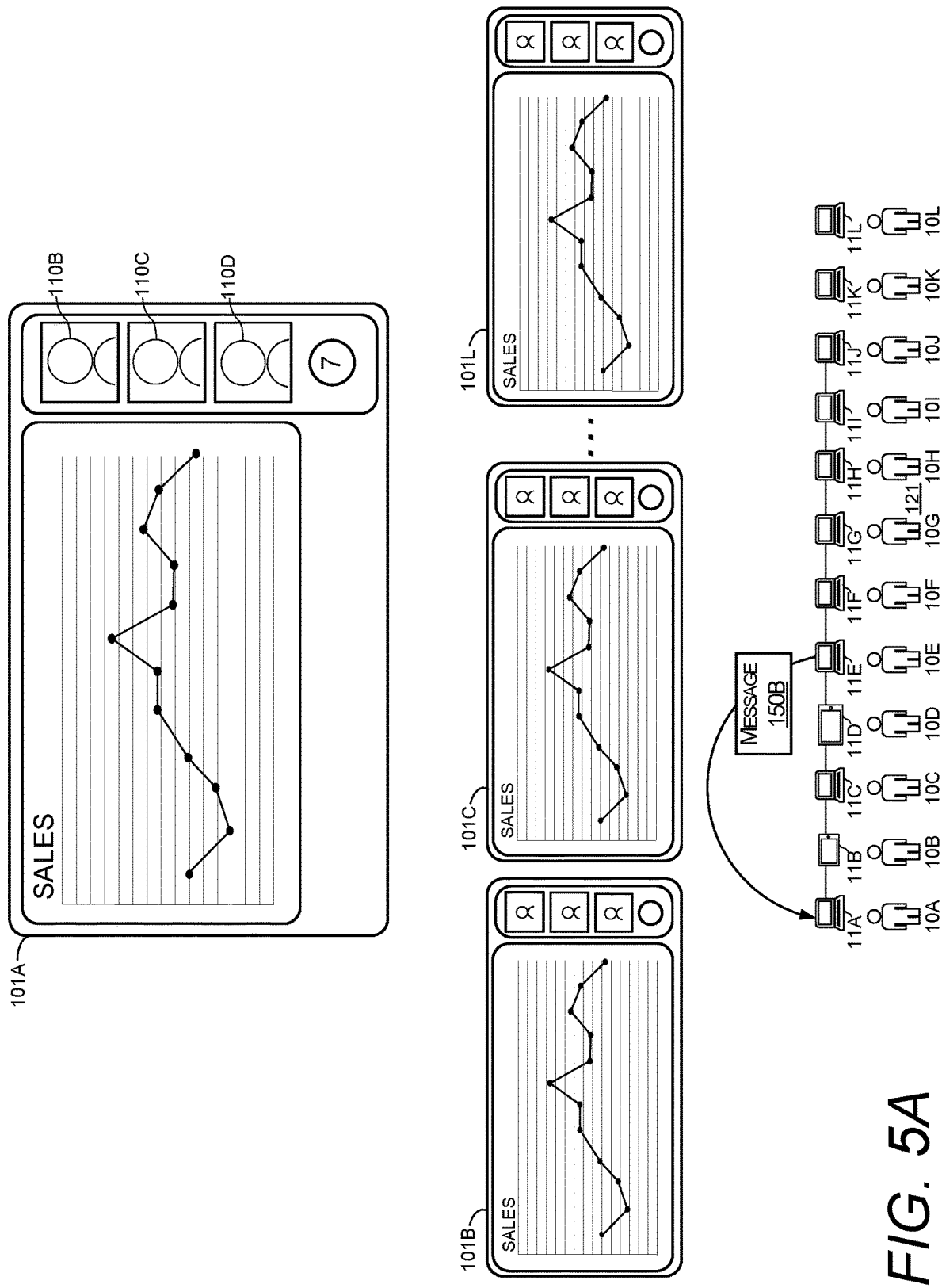
FIG. 5A is an example user interface displaying a first stage of a process where message is displayed in a thumbnail preview of an individual that sent the message.
Figure 5B:
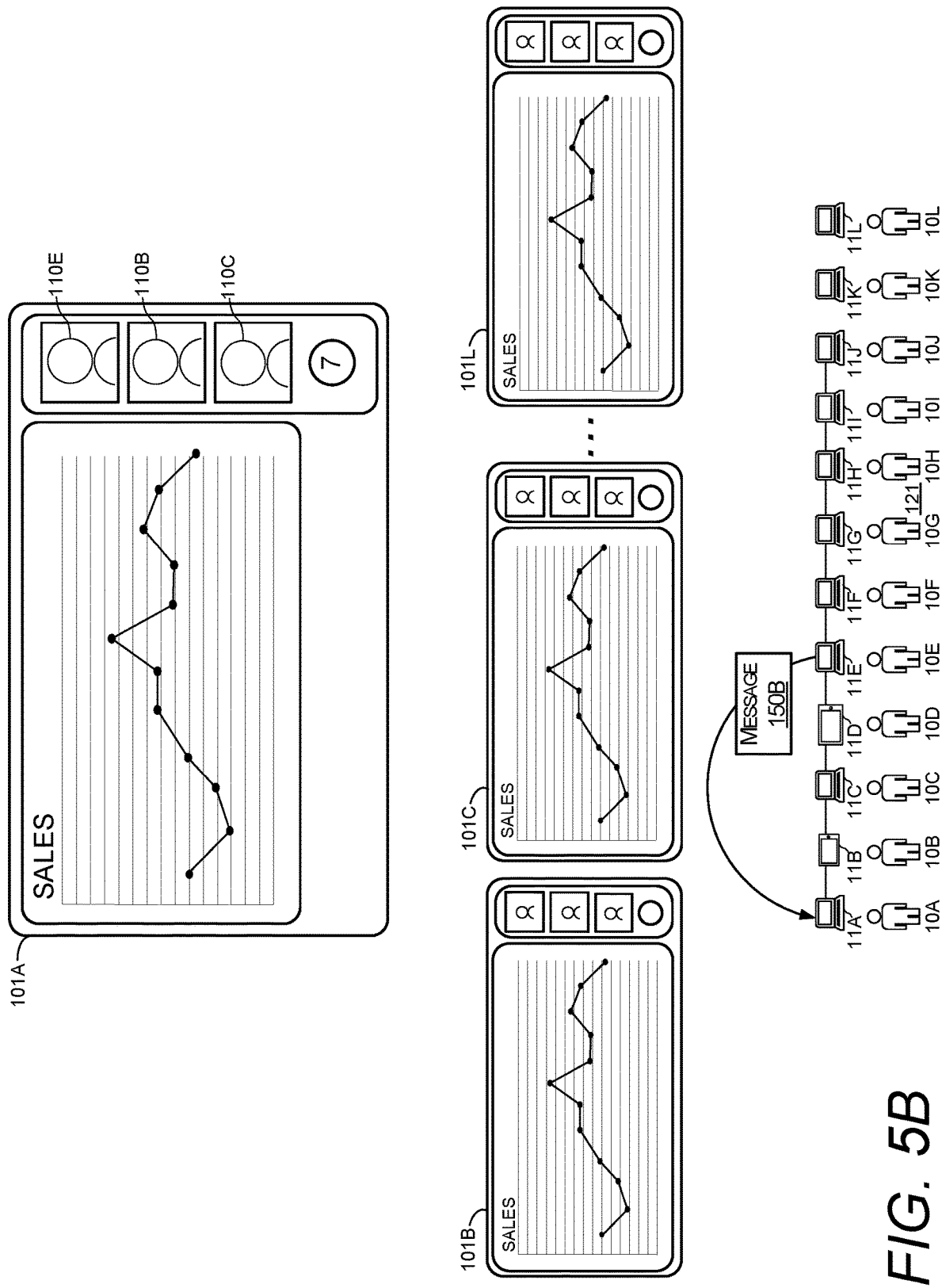
FIG. 5B is an example user interface displaying a second stage of a process where a message is displayed in a thumbnail preview of an individual that sent the message stage, where the thumbnail transitions into a viewing area at a position indicating a high priority message or user in response to receiving the message.
Figure 5C:
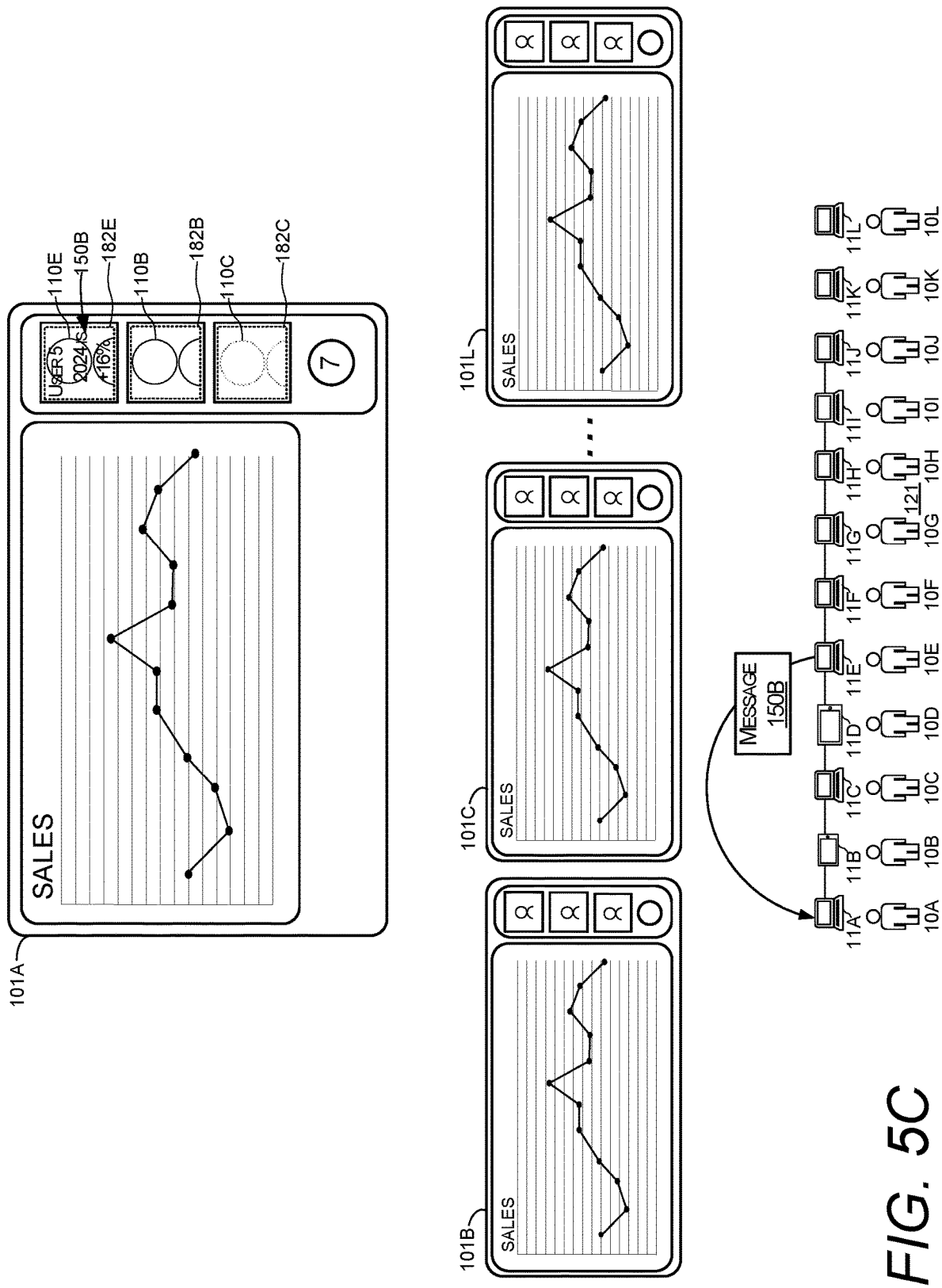
FIG. 5C is an example user interface displaying a third stage of a process where a message is displayed in a thumbnail preview of an individual that sent the message stage, where a position of the rendering and/or the message indicates a high priority message or a high priority user.

In the example shown in FIGS. 5A-5C, the fifth user and/or the message sent by the fifth user is at a priority that meets one or more thresholds. Thus, the position of the thumbnail preview is in a more prominent location than the thumbnail previews of the other users. Specifically, the rendering 110B of the second user 10B and the rendering 110C of the third user 10C are at a lower position than the fifth user 10E, which may result from the fifth user and/or the message sent by the fifth user having a priority that is higher than the second user, the third user, and/or messages of the second user or the third user. The transition from the user interface arrangement of FIG. 5A to the user interface arrangement of FIG. 5B can result in response to a receipt of a message from the fifth user 10E.

FIG. 5A shows a state of the user interface 101A that displays a number of thumbnail previews for the second user 10B, the third user 10C, and the fourth user 10D. The other participants are represented by an overflow interface element that indicates the number of other participants. When one of the other participants, e.g., the fifth user 10E, sends a message 150B from the fifth computing device 11E, the system can rearrange the thumbnail previews shown in FIG. 5A to the format of FIG. 5B, which display a thumbnail preview of the user that sent the message.

As shown in FIG. 5B, in response to fifth user 10E sending the message 150B, the user interface transitions to a format that includes the thumbnail previews (110E, 110B, and 110C) for the fifth user 10E, second user 10B, and the third user 10C. In addition, the system can update the permission data to associate an interface area with the fifth user. In this example, a data structure can associate the interface area 182E shown in FIG. 5C with an identity of the fifth user 10E. Then, as shown in FIG. 5C, using the permission data and the identity of the fifth user, the system can identify the display area 182E and render the message 150B that was sent from the fifth user 10E as an overlay on within the interface area 182E. As shown, at least a portion of the message 150B, e.g., "2024 is +16%" is displayed within the interface area 182E of the user interface 101A.

In addition to the display of messages that are directed to a particular user, such as a presenter, the system may also provide notifications as messages are received. Notifications can vary based on a number of factors. For example, a type of notification can be selected based on at least a characteristic of the message and/or a characteristic of the sender. The characteristic can include a level of relevancy of the message relative to the presentation content, a role of the sender, a priority of the sender, a domain or address associated with the sender. For example, if the sender has the same domain as the recipient, the system may generate one type of notification versus a situation where the sender has a different domain than the recipient, which can cause a second type of notification or no notification. In addition, the type of notification can be based on other factors disclosed herein such as a location of the sender relative to the recipient.

A notification type can also have a number of different properties. The properties can include a type of sound, a volume, a light level, a color of the light, or combination of sounds and light displays. Thus, the notification type, e.g., notification properties, can be based on at least one of a role or an attribute of a permitted user sending the individual message, a level of relevancy of the individual message relative to presentation content, a domain associated with the permitted user sending the individual message, or a priority of the permitted user sending the individual message. For instance, a message received from a CEO may provide one type of notification and a message from a mid-level manager can produce another type of notification.

Display characteristics of a message can be modified, or a notification can be generated, in response to a detection of an eye gaze at a particular message displayed within a rendering. Display characteristics of a message can also be modified in response to an incoming message. In some configurations, display characteristics of the messages, such as an order, size, position, color, brightness level, contrast level, or a transparency level, can vary based on a number of factors. An order of the messages can involve an arrangement of a plurality of messages where some messages are positioned in more prominent locations over other messages based on one or more factors. In other examples, the display characteristics can also include a sustain rate for each message. This allows some messages to persist indefinitely or be displayed for longer periods of time over other messages depending on one or more factors that apply to each message.

Any one of the characteristics can be modified, e.g., increased or decreased, or rather configured to be more visually prominent or less visually prominent based on one or more factors. Some example factors can include a priority of the user sending a message, a role of the user sending a message, a priority level of the message content, a level of relevancy of the message relative to the shared content, or any other attribute of the message or user sending the message. In other examples, the display characteristics of a message can be based on an email address, title, or rank of the user sending the message.

Predetermined keywords can also be emphasized in a message in response to an incoming message or in response to an eye gaze gesture meeting one or more criteria, e.g., that an eye gaze target is directed to a message for a predetermined time. For instance, if the first computer has a list of keywords, including words such as sales, performance, etc. When a message is received containing one of those keywords, the system can bring a graphical highlight to that keyword in the message as the message is overlaid on a rendering of the sender. This can be done while the other words, that are not keywords, are not highlighted.

For the renderings of each person, the thumbnail images can be arranged based on and activity level of messages sent from each participant. The activity level may be based on a quantity of messages, a quantity of data sent in the messages or a priority associated with each message. For instance, if the second user 10B sends more messages than the third user 10C, in the user interface 101A of FIG. 4A, the second user may be positioned higher on an arrangement of participant thumbnail video streams. In another example, if the second user 10B sends more messages than the fifth user 10E, the second user may be displayed on an arrangement of participant thumbnail video streams, while the fifth user 10E is not displayed.

Figure 6A:
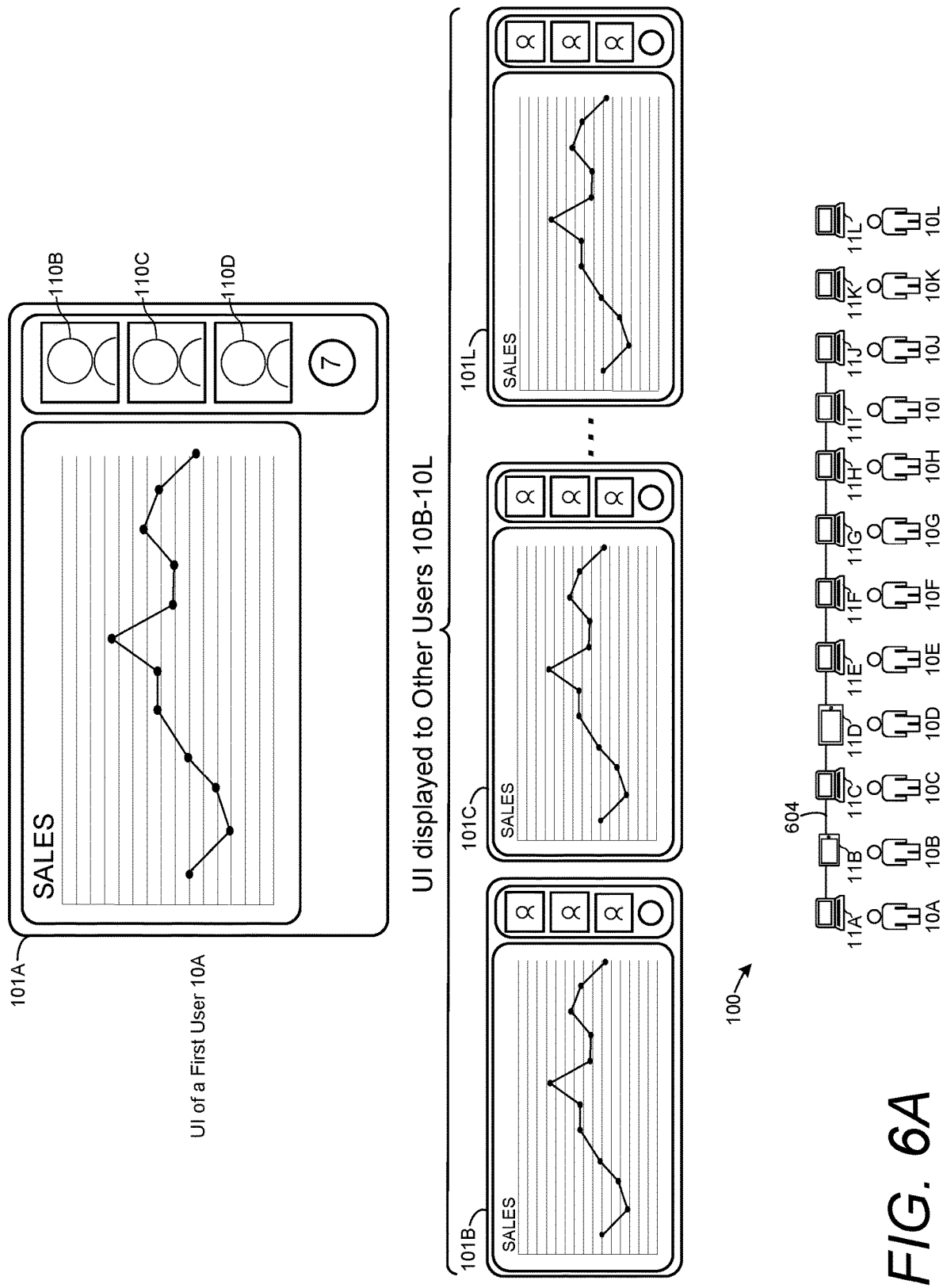
FIG. 6A shows example of a user interface in a state prior to receiving multiple messages.
Figure 6B:
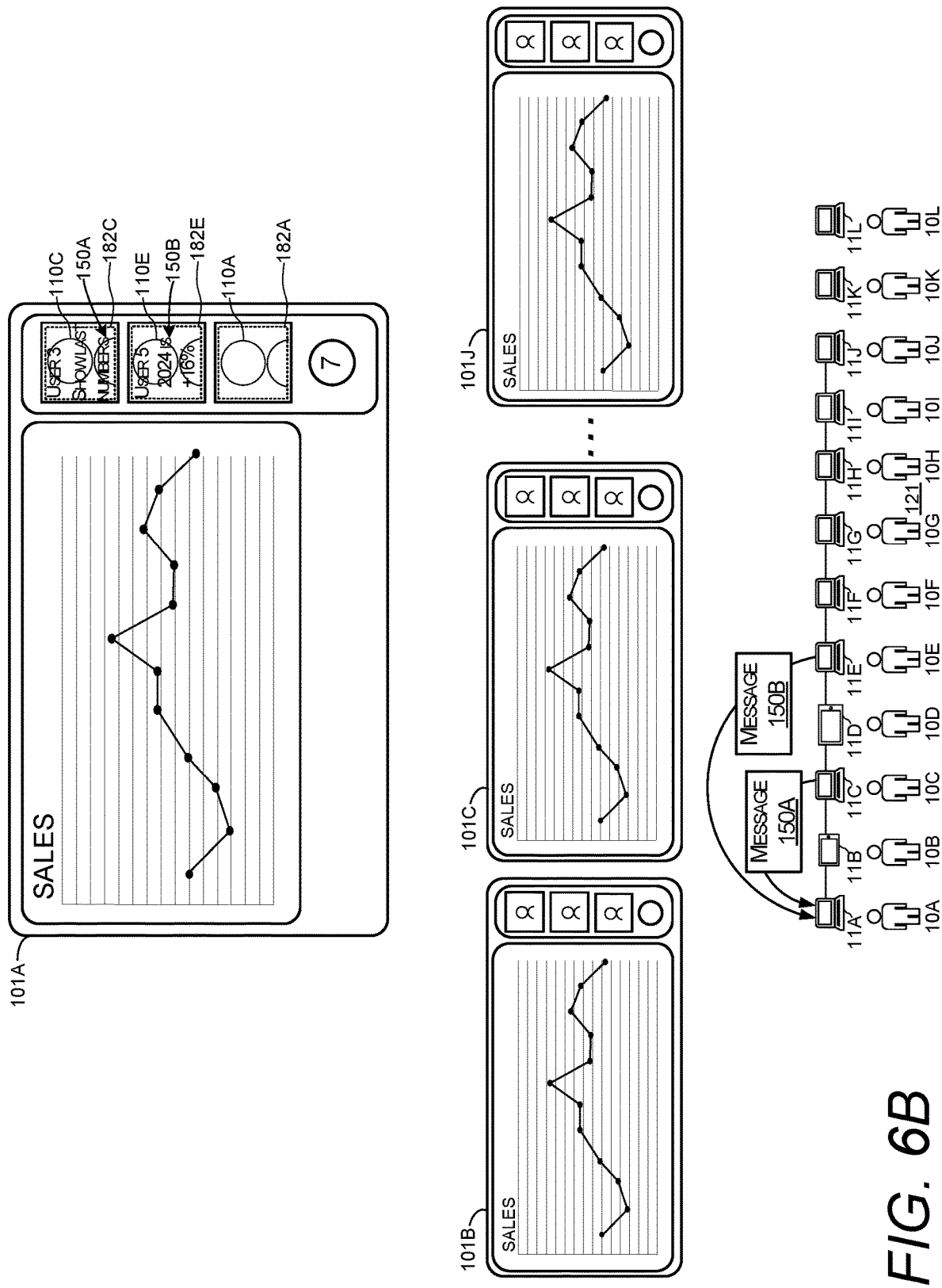
FIG. 6B shows an example user interface displaying renderings of messages from a first and second user, where the position of the messages are respectively positioned over the renderings of each message author.
Figure 6C:
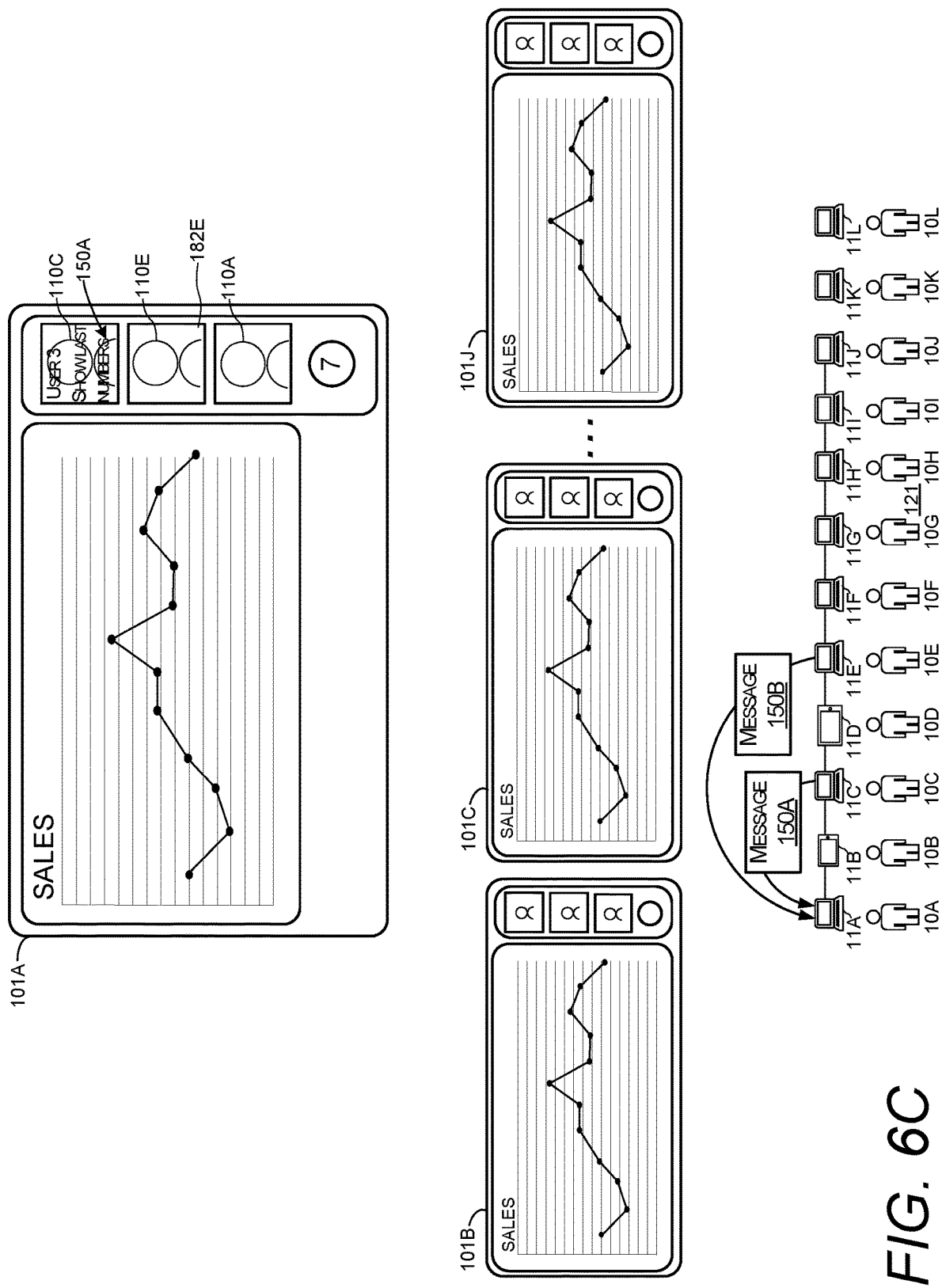
FIG. 6C shows an example user interface displaying renderings of messages with one message having a higher level of sustainability.

Referring now to FIGS. 6A-6C, an example showing a level of sustainability of two messages is shown and described below. In FIG. 6A, the user interface 101A for the first user shows a thumbnail preview for the second user, the third user and the fourth user. Then, in FIG. 6B, the third user and the fifth user send messages to the first user. For illustrative purposes, in this example, the message 150A from the third user 10C is determined to be a higher priority than the message 150B from the fifth user 10E.

This priority can be based on a combination of factors including a location and/or a rank of each sender, e.g., a sender that shares the same building as the presenter may increase or decrease the priority of the first message 150A, and a sender that does not share the same building as the presenter may increase or decrease the priority of the second message 150A. Other factors may increase or decrease the priority of each message, such as a rank of the respective sender, a level of relevancy of each message, etc. For instance, if the first message 150A is more relevant, based on a relevancy score, than the second message 150B, the first message 150A may have a higher level of sustainability than the second message 150B. A message that has a higher level of sustainability can remain in the display of the user interface for a longer period of time versus a message that has a lower level of sustainability. In the example of FIG. 6C, if the first message 150A has a higher level of sustainability than the second message 150B, the first message 150A can remain in the display while the second message 150B fades or becomes obscured.

Figure 7A:
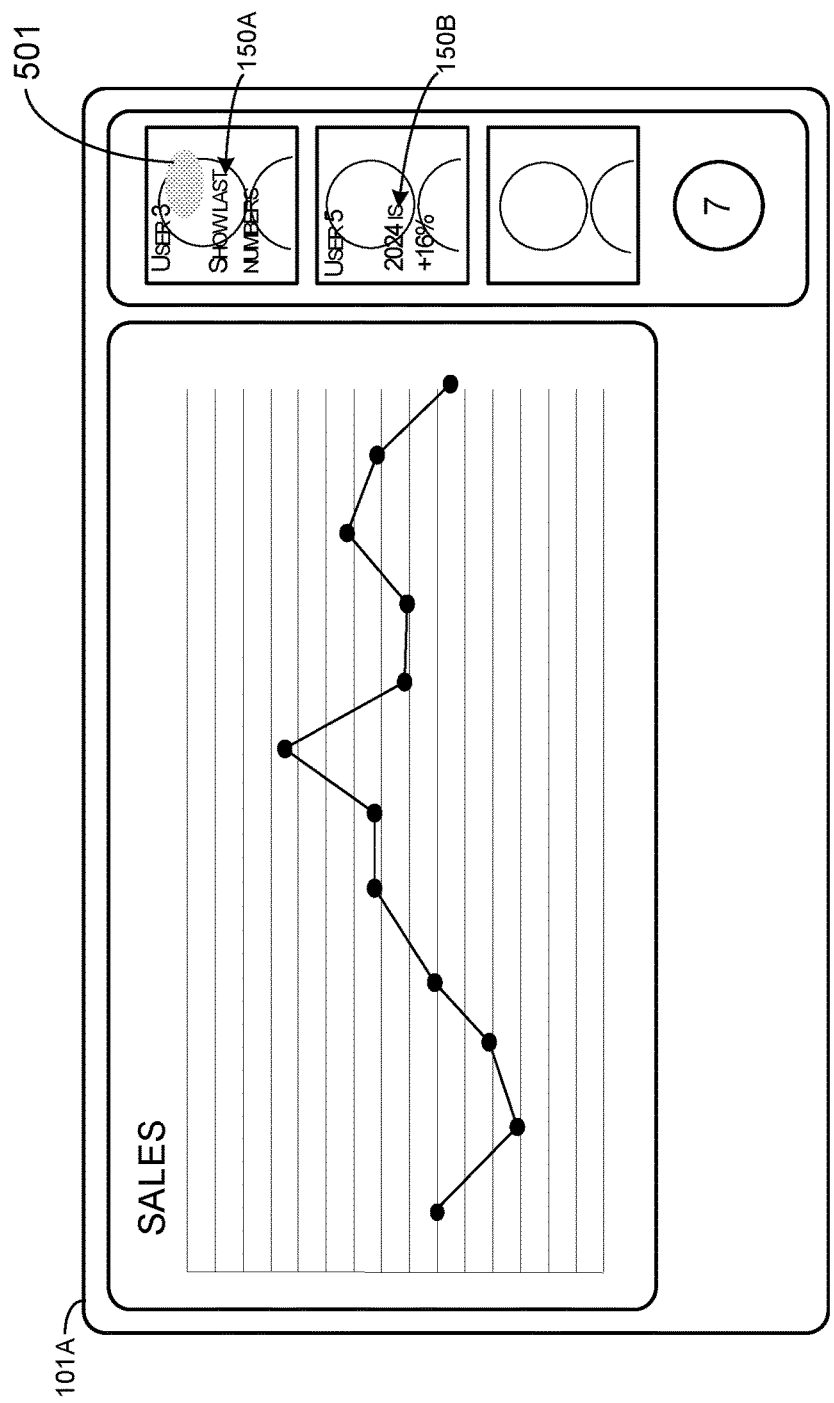
FIG. 7A is an example user interface displaying a first stage of a process where messages are displayed in thumbnail previews of individuals that sent each respective message.
Figure 7B:
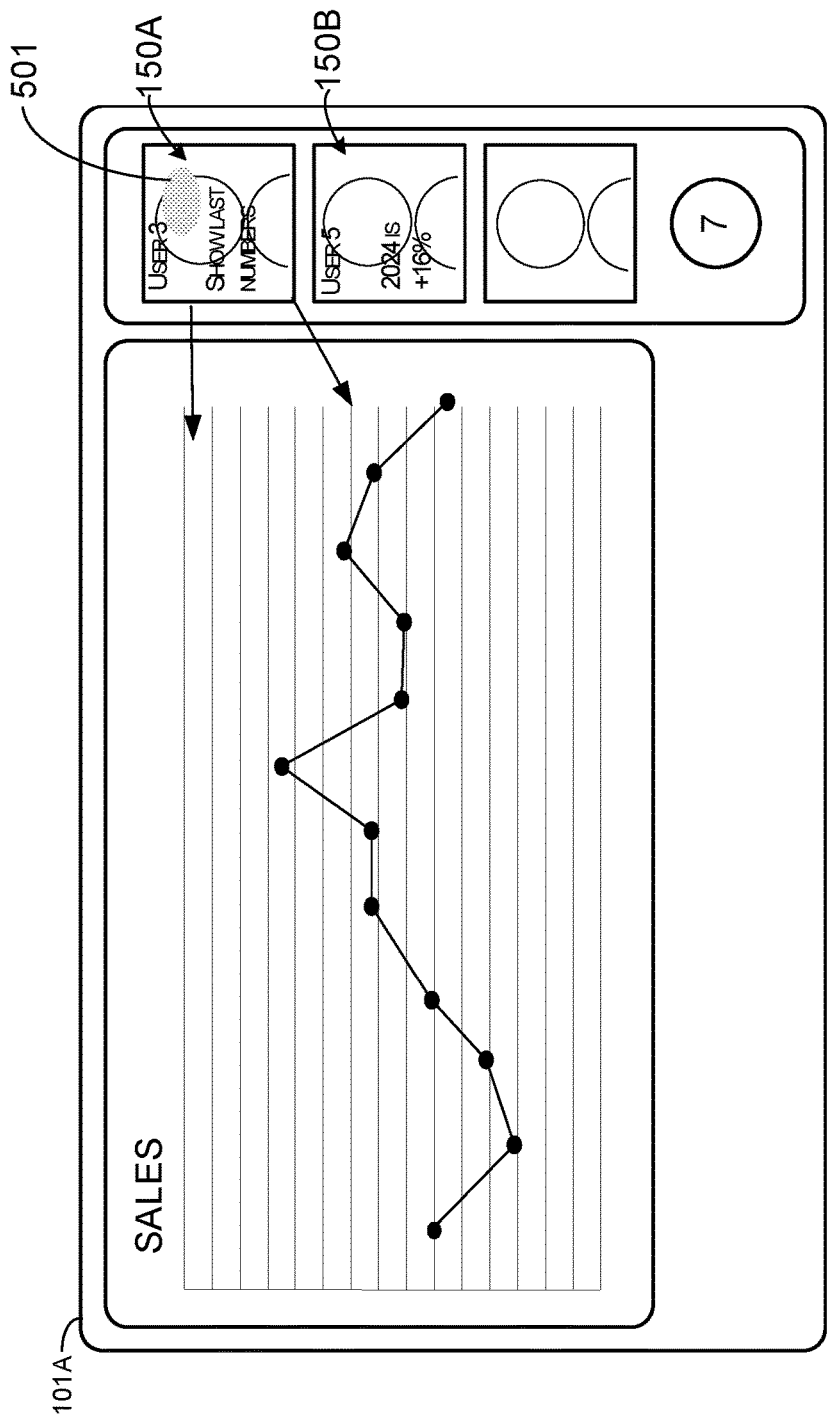
FIG. 7B is an example user interface displaying a second stage of a process where messages are displayed in thumbnail previews of individuals that sent each respective message.
Figure 7C:
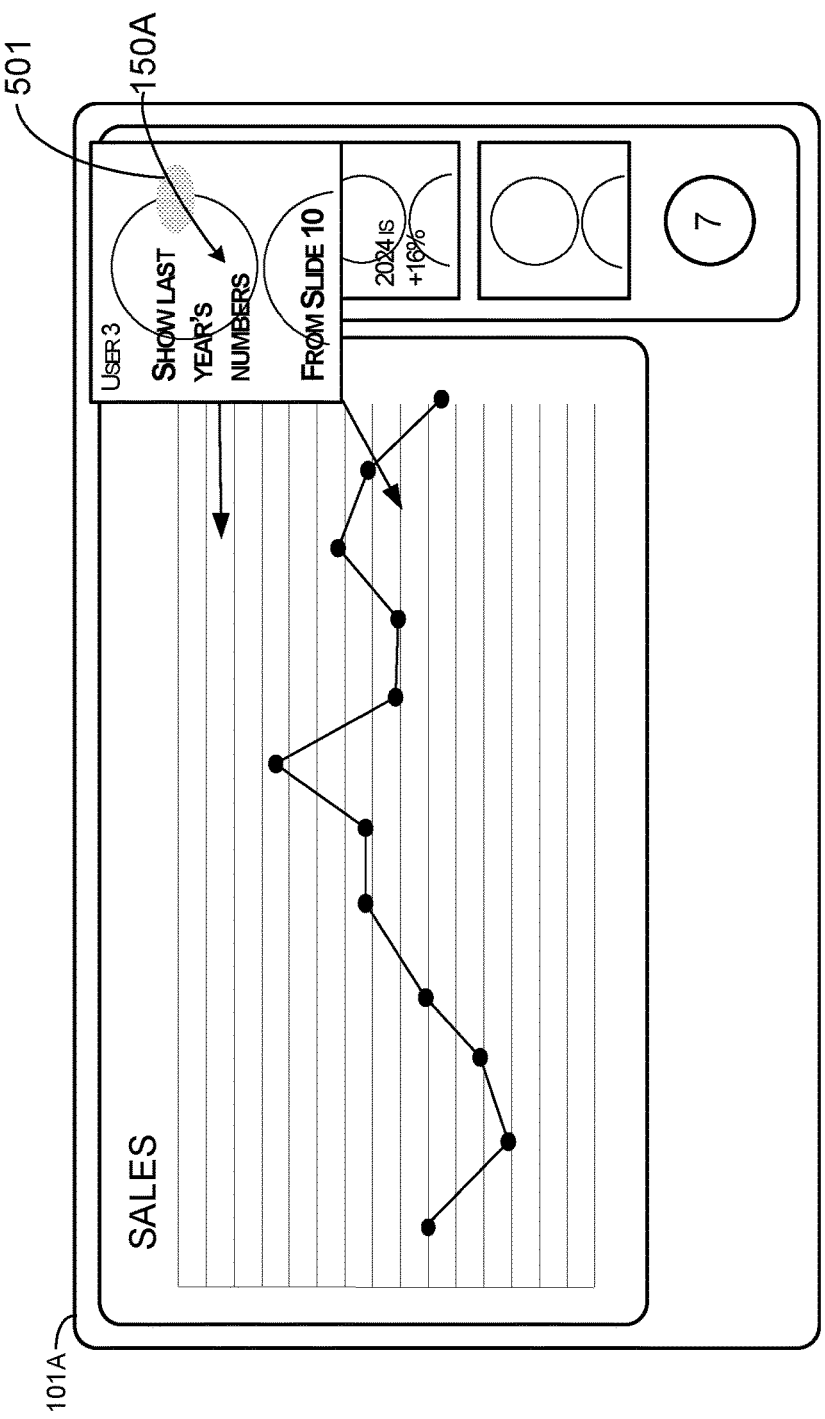
FIG. 7C is an example user interface displaying a third stage of a process where messages are displayed in thumbnail previews of individuals that sent each respective message.
Figure 7D:
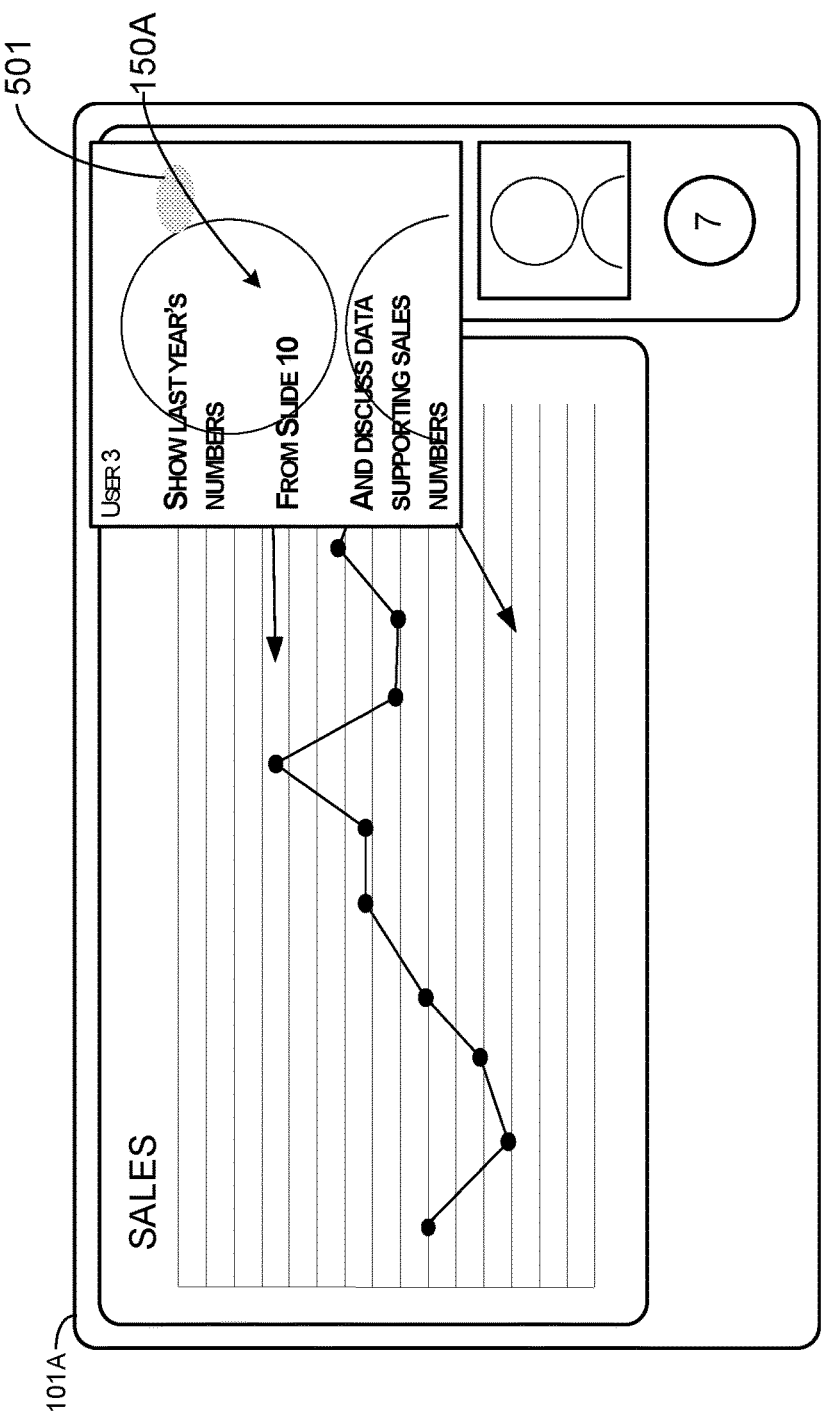
FIG. 7D is an example user interface displaying a first stage of a process where messages are displayed in thumbnail previews of individuals that sent each respective message.

As shown in the transition between FIGS. 7A-7E, a user selection of a particular message can cause the user interface to transition to a new arrangement that shows an increasing level of detail of messages from an individual user. For instance, as shown in FIG. 7A, a user input, such as an eye gaze gesture causing a computer to determine a location of a gaze target 501 within the thumbnail of the third user 10C, can cause a selection of messages from the third user. In response to the selection, as shown in FIG. 7B, the user interface can increase the size of the thumbnail of the third user 10C and also increase the size of the messages received from the third user 10C. Based on one or more gestures, such as a continued eye gaze gesture directed towards the thumbnail of the third user 10C, as shown in FIG. 7C, the user interface can increase the size of the messages and the thumbnail of the third user 10C. After a continued eye gaze gesture directed towards the rendering of the third user 10C, e.g., the eye gaze occurs past a threshold period of time, as shown in FIG. 7D, the user interface can transition to a modified user interface showing additional details of the received message and/or additional messages of a thread.

Figure 7E:
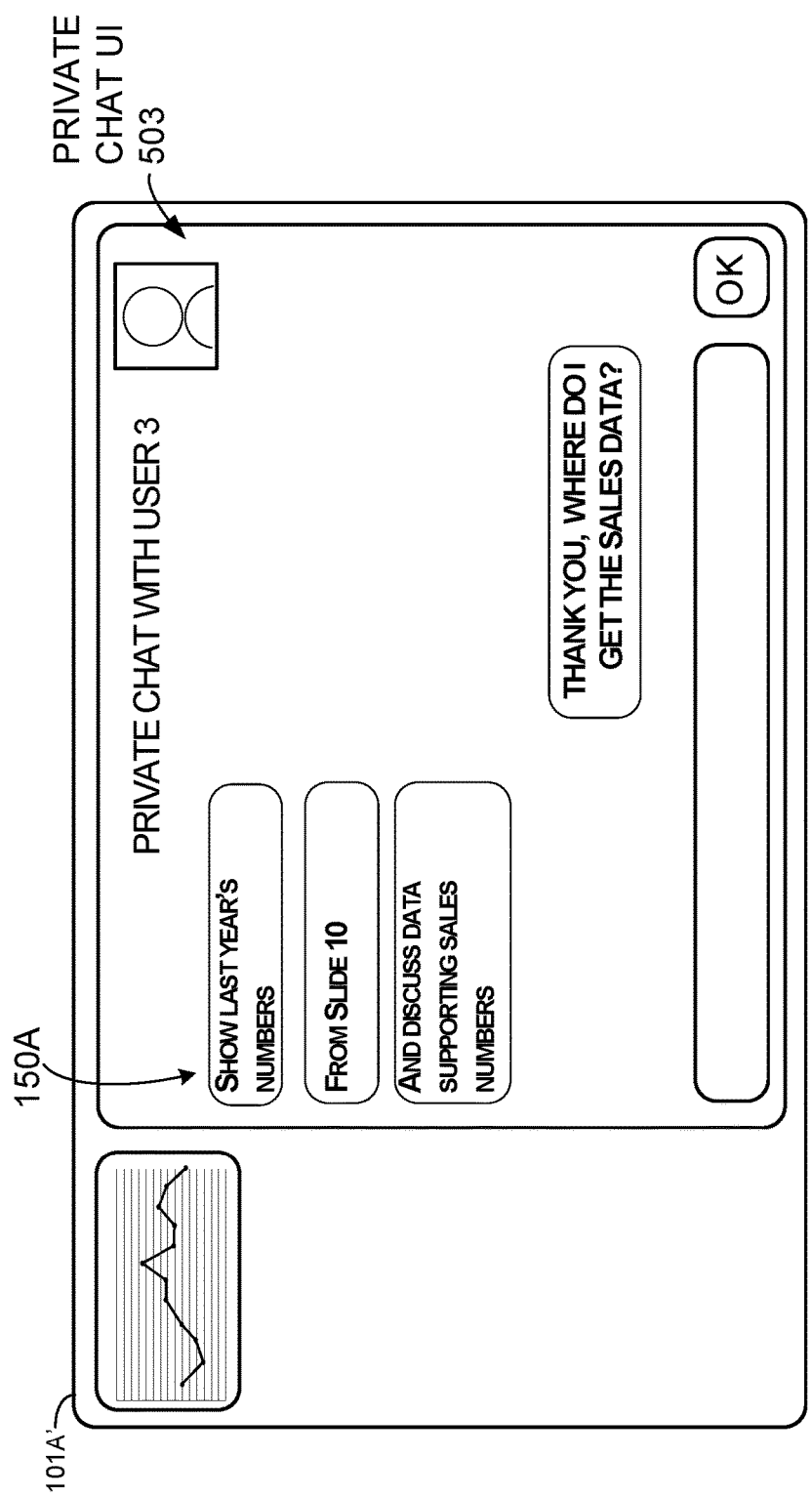
FIG. 7E is an example user interface for displaying a fifth stage of a process where a system transitions from a user interface with thumbnail previews to a chat user interface.

After a continued eye gaze gesture directed towards the rendering of the third user 10C, e.g., the eye gaze occurs past a second threshold period of time, as shown in FIG. 7E, the user interface 101A can transition to an updated user interface 101A' showing a thread 503 of messages received from one or more users, such as the third user 10C. In this environment, the chat session may be displayed contemporaneously with the shared content, e.g., the sales chart. This arrangement allows the presenter to focus on the messages in more detail while also maintaining a view of the shared content.

Figure 8:
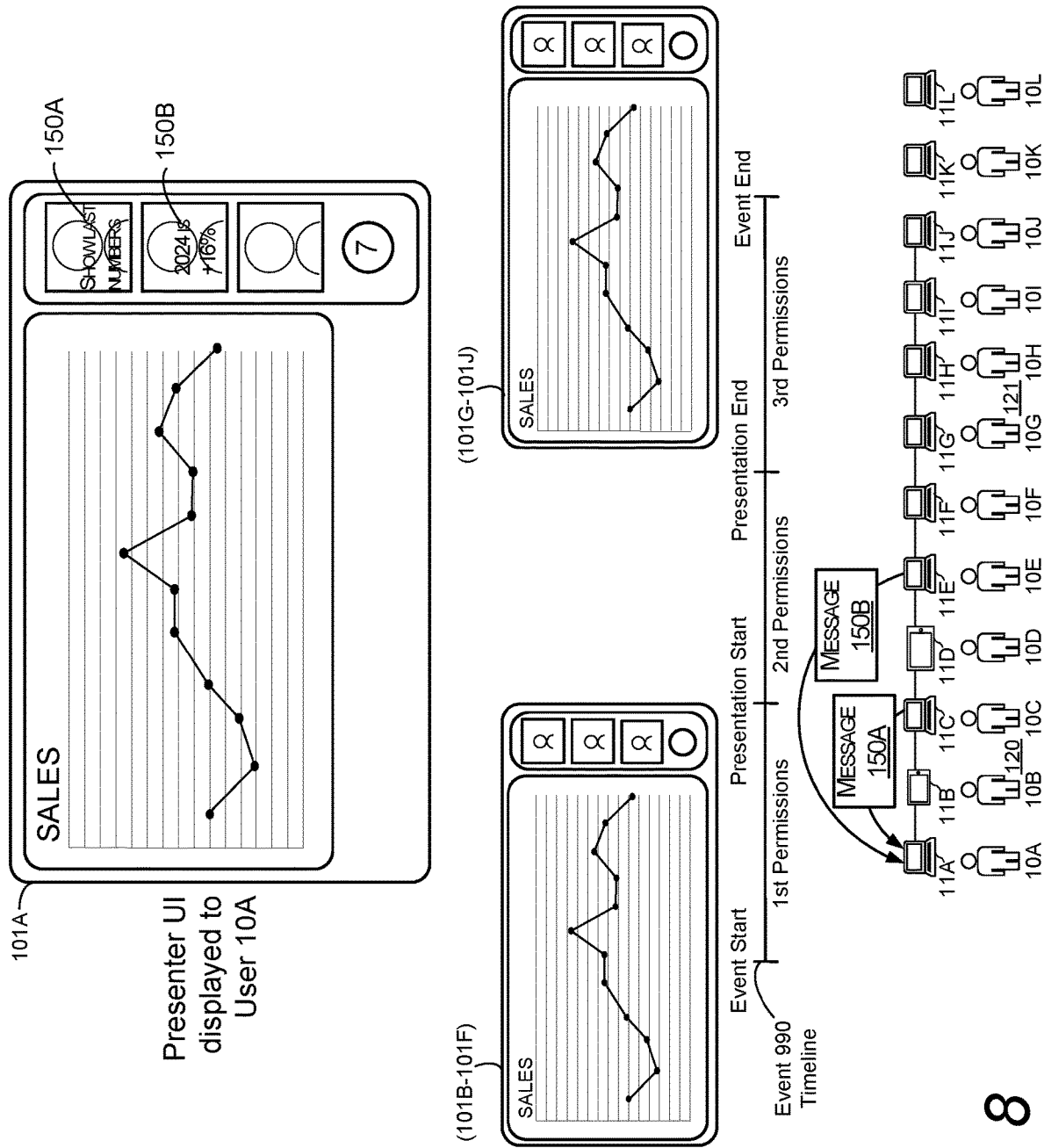
FIG. 8 is a diagram showing stages of a meeting that can be used to control permissions.

In some embodiments, the system may automatically modify or activate different sets of permissions as an event transitions through stages. For instance, as shown in FIG. 8, at the start of an event, a first set of permissions can allow certain users to send messages to a first set of individuals. The system can then transition to a second set of permissions upon the start of a new portion of an event, such as the beginning of a presentation. The second set of permissions can allow other users to send messages to a second set of individuals, such as a presenter. The system can then transition to a third set of permissions upon the conclusion of the presentation. Thus, allowing or denying another set of users to communicate messages to yet another set of users.

Figure 9:
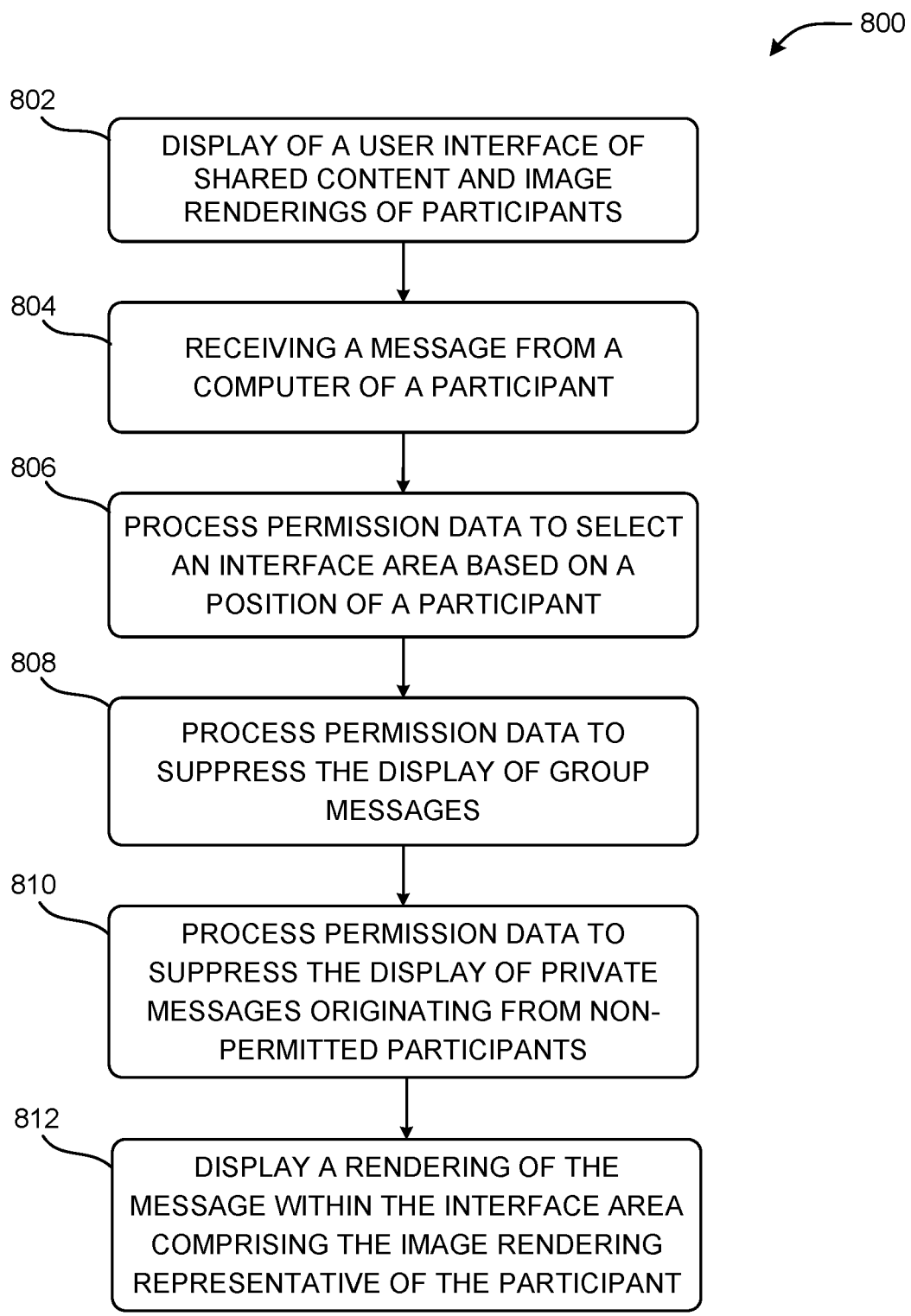
FIG. 9 is a flow diagram showing aspects of a routine implementing aspect of the present disclosure.

FIG. 9 is a diagram illustrating aspects of a routine 800 for controlling the communication of messages to a user having a predetermined role. It should be understood by those of ordinary skill in the art that the operations of the methods disclosed herein are not necessarily presented in any particular order and that performance of some or all of the operations in an alternative order is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entirety. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a system, e.g., one or more computing devices, it can be appreciated that this routine can be performed on any computing system which may include any number of computers working in concert to perform the operations disclosed herein.

Thus, it should be appreciated that the logical operations described herein are implemented as a sequence of computer implemented acts or program modules running on a computing system such as those described herein and/or 2 as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIG. 9 and the other FIGURES can be implemented in association with the example presentation user interfaces UI described above. For instance, the various devices and/or modules described herein can generate, transmit, receive, and/or display data associated with content of a communication session e.g., live content, broadcasted event, recorded content, etc. and/or a presentation UI that includes renderings of one or more participants of remote computing devices, avatars, channels, chat sessions, video streams, images, virtual objects, and/or applications associated with a communication session.

The routine 800 includes an operation 802 where the system causes a display of a user interface 101A comprising a rendering of shared content and a display of a plurality of image renderings 110 each representing individual participants 10 of the communication system 100. In some configurations, the user interface can be displayed to a particular user, such as the first user 10A shown in FIG. 1A. The plurality of image renderings can include participants of a communication session, which can be a data communication arrangement allowing the participants to exchange messages and image data.

At operation 804, the system can receive a message 150A from a remote computer 11B associated with an individual participant 10B. In one illustrative example, the message can be received from the second user shown in FIG. 1A and the message can be directed exclusively to the first user 10A. As described herein, if the message is from non-permitted users or if the message is directed to more than one user, e.g., a group message, the first computing device may reject the message or the first computing device may accept the message and suppress display of the message within the user interface 101A. The first computing device may be configured to display other user interfaces, such as private chat user interface, that allow the display of messages received from non-permitted users or group messages.

At operation 806, the system may process permission data 712A to select an interface area 182B from a plurality of interface areas 182. The permission data 712A can indicate that the interface area 182B is reserved for a display of a rendering of the message 150A originating from the remote computer 11B and the individual participant 10B. The message 150A can be exclusively directed to the computing device 11A and/or the recipient, e.g., the first user 10A. A message that is exclusively directed to the computing device 11A and/or the recipient, e.g., the first user 10A, can mean that the message is a private message that is not sent to any other recipient. In some embodiments, the multi-recipient messages are denied by a computing device based on the permission data. In some embodiments, however, multi-recipient messages can be accepted and displayed by the computing device, such as the first user's device, based on the permission data. In such embodiments, the message can be displayed as an overlay over a rendering of the user that sent the message. Thus, the operations noted below are optional filtering features.

At operation 808, system may process permission data 712A to suppress the display of group messages directed to the recipient, e.g., the first user 10A, and other participants of the plurality of participants. Thus, even if a permitted user sends a message to the first user, the system can suppress the display of the message on the first user interface as an overlay over the sender's thumbnail preview if the message has multiple recipients. Thus, the system can suppress group messages and only allow private messages single recipient displayed as overlay over the thumbnail preview. In some embodiments, suppression of the message sent to the first user and at least one other recipient can mean that the message may be received by the first computer and displayed on another user interface but not displayed as an overlay over the sender's thumbnail preview on the first user interface 101A that is concurrently displaying shared content.

In some configurations, a group member who has permissions to act as a proxy can allow group messages to be displayed on the user interface 101A as an overlay over the sender's thumbnail preview. This may occur when a designated user, e.g., a proxy, of the group permits the display of a group message as an overlay over the sender's thumbnail preview. The designated user can be any group member that has permissions for controlling the display of messages on the user interface 101A. The designated user can be selected by the presenter, e.g., the first user 10A or by an administrator.

With reference to the example of FIG. 3A, in the scenario where the first user 10A, the third user 10C, and the sixth user 10F are participants of a group message. In this example, the sixth user sends a message to the group, with the first user and the third user as recipients of the group message. The group message is suppressed from being displayed on the user interface 101A of the first user since the group message is addressed to more than one recipient. However, if the first user designates the third user as a proxy, the system can configure the permission data to allow the third user to receive and review the group message. If the third user approves the message, the third user can issue a command to allow the group message to be displayed on the user interface 101A of the first user. The group message can be displayed as a semi-transparent overlay on a rendering of the sender of the message, similar to the example shown in FIG. 1B.

At operation 810, the system may process permission data 712A to suppress the display of messages originating from a participant that is not designated as a permitted participant. This can mean that users having restricted rights are not permitted participants and users with write permissions are permitted participants. In some embodiments, suppression of the message sent from a non-permitted user can mean that the message may be received by the first computer and displayed on another user interface but not displayed as an overlay over the sender's thumbnail preview on the first user interface 101A that is concurrently displaying shared content.

In some configurations, the system can also prevent suppressed messages from being delivered to specific computing devices. Thus, in addition to suppressing the display of the messages on a particular user interface displaying multiple users, the system can also restrict the delivery of messages to specific devices that do not meet one or more criteria. For instance, a system may restrict the delivery of a group message to a computer associated with a remote domain, company, team, etc. This provides a layer of security for situations where members of a group message may be part of a separate company, separate team, etc.

With reference to the example of FIG. 3A, consider a scenario where the first user 10A is affiliated with a first company, and the third user 10C and the sixth user 10F are each affiliated with a second company. In this scenario, when the sixth user sends the group message to the first user and the third user, the system may restrict the delivery of the message to the first computing device in response to determining that the first user and the sixth user are associated with different business entities. The entities can be identified by the domains affiliated with their email addresses or other identifiers. This level of security may enhance the security of data in situations where two companies are in negotiations and select information between the entities should be limited. The feature can also utilize a proxy to allow the message to be sent to the user interface of the presenter after it is reviewed by another group member, e.g., the third user. At operation 812, the system may cause a display of the rendering of the message 150A within the interface area 182B comprises the image rendering 110B representative of the individual participant 10B. The user interface may be displayed at a computing device of a recipient of the message, such as the first user 10A of the first device 11A. Examples of an interface showing the overlay of the message over a rendering of the sender is shown in FIGS. 1B, 4C, 5C, and 6C.

In any of the operations disclosed herein, the system can generate permission data identifying permitted users that are allowed to communicate messages to a predetermined user having a particular role, such as a presenter. In some configurations, a presenter can be user having access to specific functions such as filesharing capabilities, application sharing capabilities, or other capabilities for allowing a user to direct share content to a plurality of users. The permission data can also identify non-permitted users based on the input data.

In any of the operations disclosed herein, the eye gaze feature can increase the size of the display area. For instance, as shown in the examples of FIGS. 7A-7C, in response to detecting an input defining an eye gaze target having coordinates within the interface area, the system can modify the user interface by increasing a size of the interface area displaying the rendering of the message. In some embodiments, in response to detecting an input defining an eye gaze target having coordinates within the interface area, the system can modify the user interface by increasing a quantity of text of the message that is displayed in the user interface. This is shown in FIGS. 7A-7D where the user interface shows an increasing the amount of text that is displayed in response to the eye gaze gesture being maintained within an interface area 182 for a predetermined period of time. In some embodiments, in response to detecting an input defining an eye gaze target having coordinates within the interface area, the system can modify the user interface by increasing a size of text used to display at least a portion of the message in the user interface. This is shown in FIGS. 7A-7D where the user interface shows an increasing size of the text that is displayed in response to the eye gaze gesture being maintained within an interface area 182 for a predetermined period of time.

For the example shown in FIG. 7E, the system can cause a transition to an updated user interface 101A' showing a full chat user interface. In some configurations, the system can modify the user interface by causing a display of an updated user interface comprising a thread of messages associated with the message and a text entry field for receiving new messages for the thread of messages, wherein the modification of the user interface is in response to a detection of an eye gaze gesture causing an input defining an eye gaze target having coordinates within the interface area. This can be executed in response to a second threshold of time, if a first threshold of time is used to modify at least one of a size, a quantity of text or a display characteristic of the message.

In any of the operations disclosed herein, the system can cause a suppression of a message, wherein suppressing the display of group messages directed to the recipient and other participants causes the computing device to restrict the display of the message on the user interface and/or allow the display of the message on other user interfaces. The other user interfaces can be part of another application or an operating system.

In some configurations, any one of the features disclosed herein can be integrated in a method for controlling positions of messages 150 communicated to a user 10A of a communication system 100, the method comprising the following operations. Causing a display of a user interface 101A on a computing device 11A of the user 10A, the user interface 101A comprising a rendering of shared content 115 and a display of a plurality of image renderings 110 each representing individual participants 10 of the communication system 100. Receiving a message 150A from a remote computer 11B associated with an individual participant 10B. Processing permission data 712A to select an interface area 182B from a plurality of interface areas 182, the permission data 712A indicating that the interface area 182B is reserved for a display of the message 150A originating from the remote computer 11B associated with the individual participant 10B and exclusively directed to the computing device 11A associated with the recipient 10A, wherein the interface area 182B comprises an identification of the individual participant 10B, wherein the permission data 712A causes the computing device 11A associated with the recipient 10A to not display group messages directed to the recipient 10A and other participants of the plurality of participants, the permission data 712A further causes the computing device 11A associated with the recipient 10A to not display the display of private messages originating from one or more participants that are not designated as permitted participants, and causing a display of the rendering of the message 150A within the interface area 182B comprising the image rendering 110B representative of the individual participant 10B. The identification of the individual participant 10B can be an image rendering 110B representative or a name or any other identifier.

The action of "not displaying" a message, such as a group message, also means the action of restricting the display of a message as an overlay over an identifier of the sender. This can also mean the delivery of the message to the computer of the of a person having a predetermined role, e.g., a presenter, but the message is displayed on other user interfaces other than one that is used to display content that is shared with participants of a communication session. The action of "not displaying" a message, such as a group message, can also mean the action of restricting the delivery of a message to a computer of a person having a predetermined role, e.g., a presenter. These features, including not displaying a message, cover a scenario that the server inhibits the message to be included in video stream to user in the first place.

Figure 10:
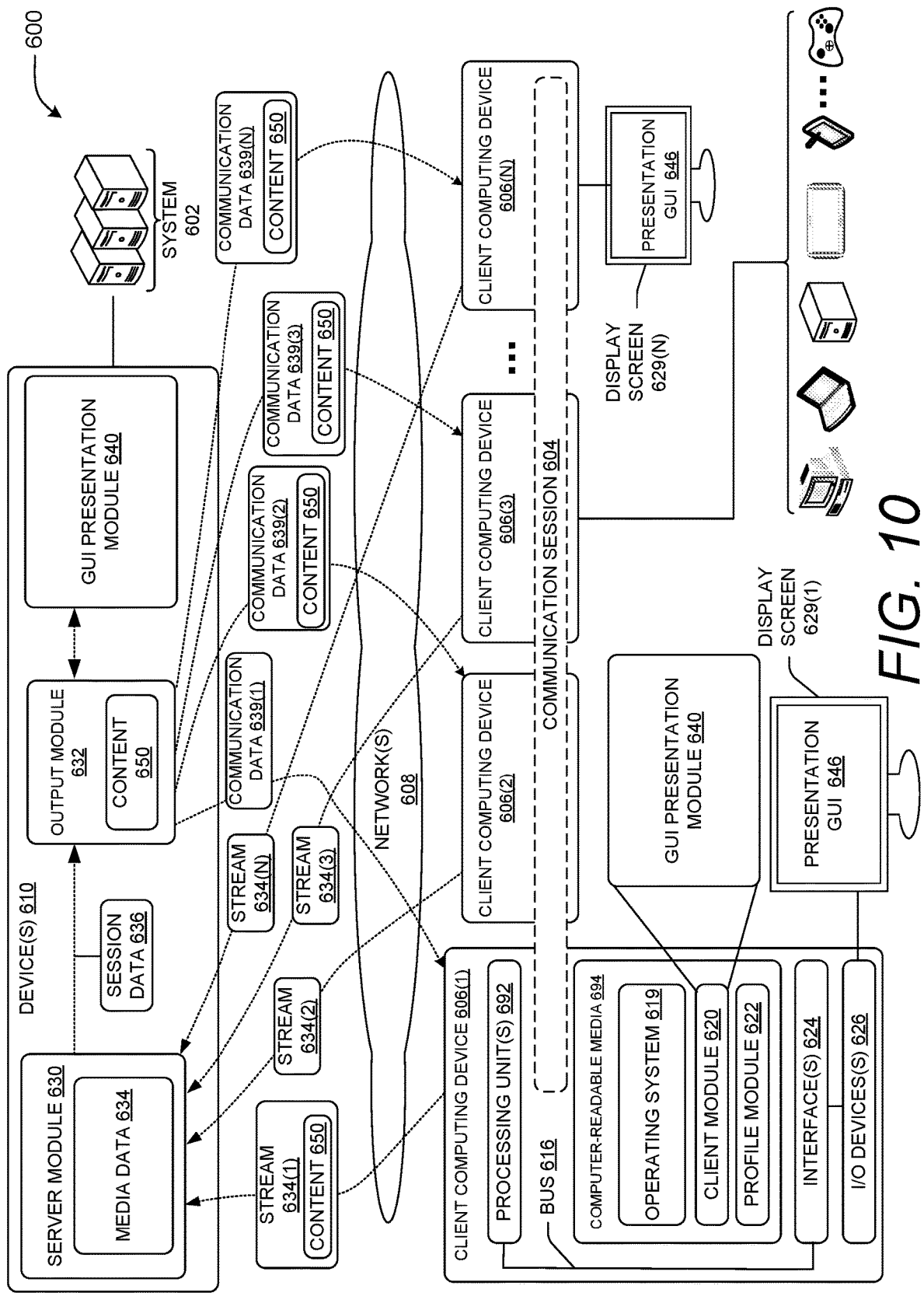
FIG. 10 is a diagram illustrating a distributed computing environment capable of implementing aspects of the techniques and technologies presented herein.

FIG. 10 is a diagram illustrating an example environment 600 in which a system 602 can implement the techniques disclosed herein. It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached figures should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

In some implementations, a system 602 may function to collect, analyze, and share data that is displayed to users of a communication session 604. As illustrated, the communication session 603 may be implemented between a number of client computing devices 606(1) through 606(N) (where N is a number having a value of two or greater) that are associated with or are part of the system 602. The client computing devices 606(1) through 606(N) enable users, also referred to as individuals, to participate in the communication session 603.

In this example, the communication session 603 is hosted, over one or more network(s) 608, by the system 602. That is, the system 602 can provide a service that enables users of the client computing devices 606(1) through 606(N) to participate in the communication session 603 (e.g., via a live viewing and/or a recorded viewing). Consequently, a "participant" to the communication session 603 can comprise a user and/or a client computing device (e.g., multiple users may be in a room participating in a communication session via the use of a single client computing device), each of which can communicate with other participants. As an alternative, the communication session 603 can be hosted by one of the client computing devices 606(1) through 606(N) utilizing peer-to-peer technologies. The system 602 can also host chat conversations and other team collaboration functionality (e.g., as part of an application suite).

In some implementations, such chat conversations and other team collaboration functionality are considered external communication sessions distinct from the communication session 603. A computing system 602 that collects participant data in the communication session 603 may be able to link to such external communication sessions. Therefore, the system may receive information, such as date, time, session particulars, and the like, that enables connectivity to such external communication sessions. In one example, a chat conversation can be conducted in accordance with the communication session 603. Additionally, the system 602 may host the communication session 603, which includes at least a plurality of participants co-located at a meeting location, such as a meeting room or auditorium, or located in disparate locations.

In examples described herein, client computing devices 606(1) through 606(N) participating in the communication session 603 are configured to receive and render for display, on a user interface of a display screen, communication data. The communication data can comprise a collection of various instances, or streams, of live content and/or recorded content. The collection of various instances, or streams, of live content and/or recorded content may be provided by one or more cameras, such as video cameras. The cameras and other components of the system can be configured to capture images of the user and determine a gaze direction and a gaze target on a screen of a computer. For example, an individual stream of live or recorded content can comprise media data associated with a video feed provided by a video camera (e.g., audio and visual data that capture the appearance and speech of a user participating in the communication session). In some implementations, the video feeds may comprise such audio and visual data, one or more still images, and/or one or more avatars. The one or more still images may also comprise one or more avatars.

Another example of an individual stream of live or recorded content can comprise media data that includes an avatar of a user participating in the communication session along with audio data that captures the speech of the user. Yet another example of an individual stream of live or recorded content can comprise media data that includes a file displayed on a display screen along with audio data that captures the speech of a user. Accordingly, the various streams of live or recorded content within the communication data enable a remote meeting to be facilitated between a group of people and the sharing of content within the group of people. In some implementations, the various streams of live or recorded content within the communication data may originate from a plurality of co-located video cameras, positioned in a space, such as a room, to record or stream live a presentation that includes one or more individuals presenting and one or more individuals consuming presented content.

A participant or attendee can view content of the communication session 603 live as activity occurs, or alternatively, via a recording at a later time after the activity occurs. In the examples described herein, client computing devices 606(1) through 606(N) participating in the communication session 603 are configured to receive and render for display, on a user interface of a display screen, communication data. The communication data can comprise a collection of various instances, or streams, of live and/or recorded content. For example, an individual stream of content can comprise media data associated with a video feed (e.g., audio and visual data that capture the appearance and speech of a user participating in the communication session). Another example of an individual stream of content can comprise media data that includes an avatar of a user participating in the conference session along with audio data that captures the speech of the user. Yet another example of an individual stream of content can comprise media data that includes a content item displayed on a display screen and/or audio data that captures the speech of a user. Accordingly, the various streams of content within the communication data enable a meeting or a broadcast presentation to be facilitated amongst a group of people dispersed across remote locations.

A participant or attendee to a communication session is a person that is in range of a camera, or other image and/or audio capture device such that actions and/or sounds of the person which are produced while the person is viewing and/or listening to the content being shared via the communication session can be captured (e.g., recorded). For instance, a participant may be sitting in a crowd viewing the shared content live at a broadcast location where a stage presentation occurs. Or a participant may be sitting in an office conference room viewing the shared content of a communication session with other colleagues via a display screen. Even further, a participant may be sitting or standing in front of a personal device (e.g., tablet, smartphone, computer, etc.) viewing the shared content of a communication session alone in their office or at home.

The system 602 of FIG. 10 includes device(s) 610. The device(s) 610 and/or other components of the system 602 can include distributed computing resources that communicate with one another and/or with the client computing devices 606(1) through 606(N) via the one or more network(s) 608. In some examples, the system 602 may be an independent system that is tasked with managing aspects of one or more communication sessions such as communication session 603. As an example, the system 602 may be managed by entities such as SLACK, WEBEX, GOTOMEETING, GOOGLE HANGOUTS, etc.

Network(s) 608 may include, for example, public networks such as the Internet, private networks such as an institutional and/or personal intranet, or some combination of private and public networks. Network(s) 608 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 608 may utilize communications protocols, including packet-based and/or datagram-based protocols such as Internet protocol ("IP"), transmission control protocol ("TCP"), user datagram protocol ("UDP"), or other types of protocols. Moreover, network(s) 608 may also include a number of devices that facilitate network communications and/or form a hardware basis for the networks, such as switches, routers, gateways, access points, firewalls, base stations, repeaters, backbone devices, and the like.

In some examples, network(s) 608 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, 802.11ac and so forth), and other standards.

In various examples, device(s) 610 may include one or more computing devices that operate in a cluster or other grouped configuration to share resources, balance load, increase performance, provide fail-over support or redundancy, or for other purposes. For instance, device(s) 610 may belong to a variety of classes of devices such as traditional server-type devices, desktop computer-type devices, and/or mobile-type devices. Thus, although illustrated as a single type of device or a server-type device, device(s) 610 may include a diverse variety of device types and are not limited to a particular type of device. Device(s) 610 may represent, but are not limited to, server computers, desktop computers, web-server computers, personal computers, mobile computers, laptop computers, tablet computers, or any other sort of computing device.

A client computing device (e.g., one of client computing device(s) 606(1) through 606(N)) (each of which are also referred to herein as a "data processing system") may belong to a variety of classes of devices, which may be the same as, or different from, device(s) 610, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 606(1) through 606(N) of the various classes and device types can represent any type of computing device having one or more data processing unit(s) 692 operably connected to computer-readable media 694 such as via a bus 616, which in some instances can include one or more of a system bus, a data bus, an address bus, a PCI bus, a Mini-PCI bus, and any variety of local, peripheral, and/or independent buses.

Executable instructions stored on computer-readable media 694 may include, for example, an operating system 619, a client module 620, a profile module 622, and other modules, programs, or applications that are loadable and executable by data processing units(s) 692.

Client computing device(s) 606(1) through 606(N) may also include one or more interface(s) 624 to enable communications between client computing device(s) 606(1) through 606(N) and other networked devices, such as device(s) 610, over network(s) 608. Such network interface(s) 624 may include one or more network interface controllers (NICs) or other types of transceiver devices to send and receive communications and/or data over a network. Moreover, client computing device(s) 606(1) through 606(N) can include input/output ("I/O") interfaces (devices) 626 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 10 illustrates that client computing device 606(1) is in some way connected to a display device (e.g., a display screen 629(N)), which can display a UI according to the techniques described herein.

In the example environment 600 of FIG. 10, client computing devices 606(1) through 606(N) may use their respective client modules 620 to connect with one another and/or other external device(s) in order to participate in the communication session 603, or in order to contribute activity to a collaboration environment. For instance, a first user may utilize a client computing device 606(1) to communicate with a second user of another client computing device 606(2). When executing client modules 620, the users may share data, which may cause the client computing device 606(1) to connect to the system 602 and/or the other client computing devices 606(2) through 606(N) over the network(s) 608.

The client computing device(s) 606(1) through 606(N) may use their respective profile modules 622 to generate participant profiles (not shown in FIG. 10) and provide the participant profiles to other client computing devices and/or to the device(s) 610 of the system 602. A participant profile may include one or more of an identity of a user or a group of users (e.g., a name, a unique identifier ("ID"), etc.), user data such as personal data, machine data such as location (e.g., an IP address, a room in a building, etc.) and technical capabilities, etc. Participant profiles may be utilized to register participants for communication sessions.

As shown in FIG. 10, the device(s) 610 of the system 602 include a server module 630 and an output module 632. In this example, the server module 630 is configured to receive, from individual client computing devices such as client computing devices 606(1) through 606(N), media streams 634(1) through 634(N). As described above, media streams can comprise a video feed (e.g., audio and visual data associated with a user), audio data which is to be output with a presentation of an avatar of a user (e.g., an audio only experience in which video data of the user is not transmitted), text data (e.g., text messages), file data and/or screen sharing data (e.g., a document, a slide deck, an image, a video displayed on a display screen, etc.), and so forth. Thus, the server module 630 is configured to receive a collection of various media streams 634(1) through 634(N) during a live viewing of the communication session 603 (the collection being referred to herein as "media data 634"). In some scenarios, not all of the client computing devices that participate in the communication session 603 provide a media stream. For example, a client computing device may only be a consuming, or a "listening", device such that it only receives content associated with the communication session 603 but does not provide any content to the communication session 603.

In various examples, the server module 630 can select aspects of the media streams 634 that are to be shared with individual ones of the participating client computing devices 606(1) through 606(N). Consequently, the server module 630 may be configured to generate session data 636 based on the streams 634 and/or pass the session data 636 to the output module 632. Then, the output module 632 may communicate communication data 639 to the client computing devices (e.g., client computing devices 606(1) through 606(3) participating in a live viewing of the communication session). The communication data 639 may include video, audio, and/or other content data, provided by the output module 632 based on content 650 associated with the output module 632 and based on received session data 636. The content 650 can include the streams 634 or other shared data, such as an image file, a spreadsheet file, a slide deck, a document, etc. The streams 634 can include a video component depicting images captured by an I/O device 626 on each client computer.

As shown, the output module 632 transmits communication data 639(1) to client computing device 606(1), and transmits communication data 639(2) to client computing device 606(2), and transmits communication data 639(3) to client computing device 606(3), etc. The communication data 639 transmitted to the client computing devices can be the same or can be different (e.g., positioning of streams of content within a user interface may vary from one device to the next).

In various implementations, the device(s) 610 and/or the client module 620 can include GUI presentation module 640. The GUI presentation module 640 may be configured to analyze communication data 639 that is for delivery to one or more of the client computing devices 606. Specifically, the UI presentation module 640, at the device(s) 610 and/or the client computing device 606, may analyze communication data 639 to determine an appropriate manner for displaying video, image, and/or content on the display screen 629 of an associated client computing device 606. In some implementations, the GUI presentation module 640 may provide video, image, and/or content to a presentation GUI 646 rendered on the display screen 629 of the associated client computing device 606. The presentation GUI 646 may be caused to be rendered on the display screen 629 by the GUI presentation module 640. The presentation GUI 646 may include the video, image, and/or content analyzed by the GUI presentation module 640.

In some implementations, the presentation GUI 646 may include a plurality of sections or grids that may render or comprise video, image, and/or content for display on the display screen 629. For example, a first section of the presentation GUI 646 may include a video feed of a presenter or individual, a second section of the presentation GUI 646 may include a video feed of an individual consuming meeting information provided by the presenter or individual. The GUI presentation module 640 may populate the first and second sections of the presentation GUI 646 in a manner that properly imitates an environment experience that the presenter and the individual may be sharing.

In some implementations, the GUI presentation module 640 may enlarge or provide a zoomed view of the individual represented by the video feed in order to highlight a reaction, such as a facial feature, the individual had to the presenter. In some implementations, the presentation GUI 646 may include a video feed of a plurality of participants associated with a meeting, such as a general communication session. In other implementations, the presentation GUI 646 may be associated with a channel, such as a chat channel, enterprise Teams channel, or the like. Therefore, the presentation GUI 646 may be associated with an external communication session that is different from the general communication session.

Figure 11:
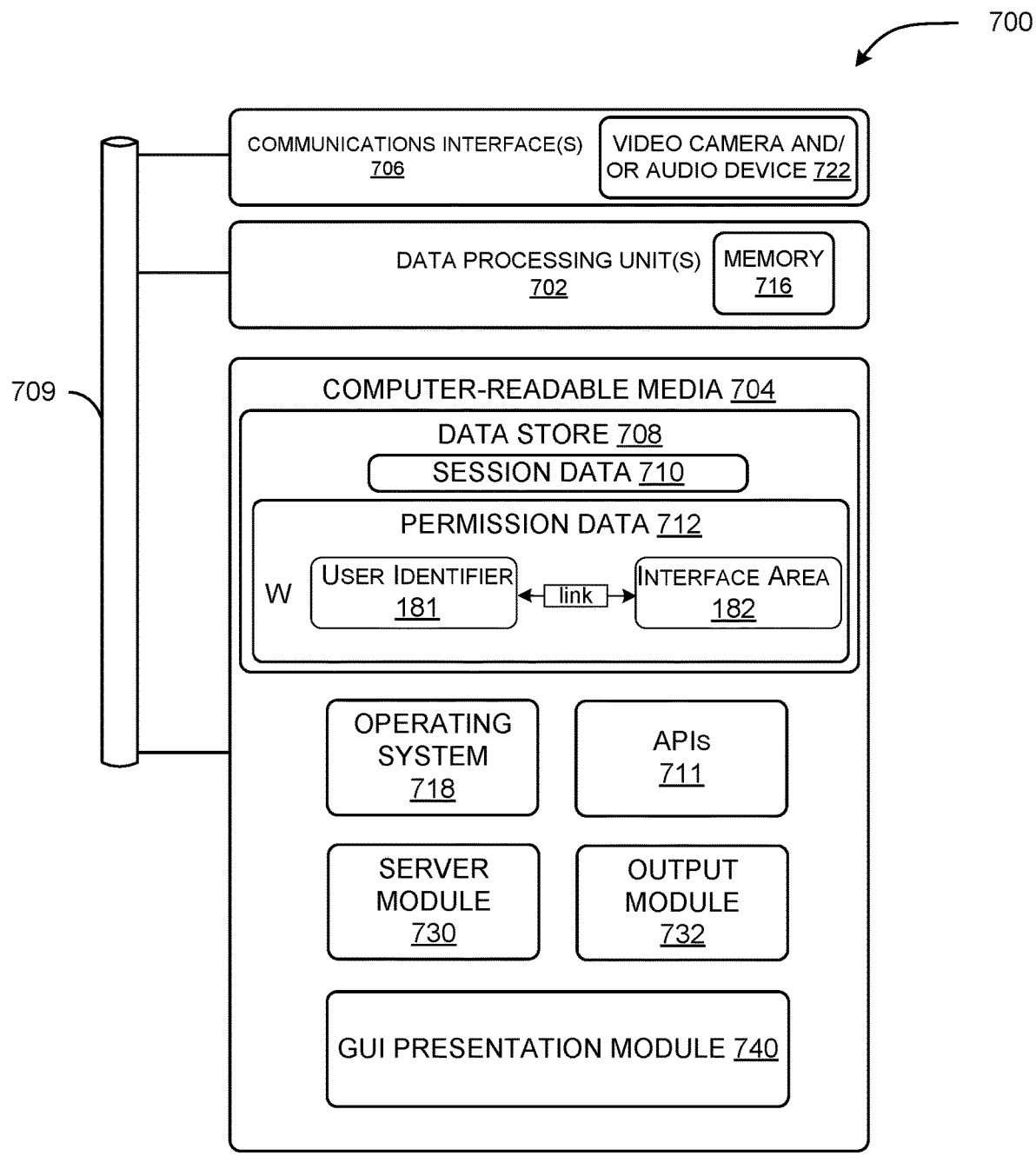
FIG. 11 is a computer architecture diagram illustrating a computing device architecture for a computing device capable of implementing aspects of the techniques and technologies presented herein.

FIG. 11 illustrates a diagram that shows example components of an example device 700 (also referred to herein as a "computing device") configured to generate data for some of the user interfaces disclosed herein. The device 700 may generate data that may include one or more sections that may render or comprise video, images, virtual objects, and/or content for display on the display screen 629. The device 700 may represent one of the device(s) described herein. Additionally, or alternatively, the device 700 may represent one of the client computing devices 606.

As illustrated, the device 700 includes one or more data processing unit(s) 702, computer-readable media 704, and communication interface(s) 706. The components of the device 700 are operatively connected, for example, via a bus 709, which may include one or more of a system bus, a data bus, an address bus, a PCI bus, a Mini-PCI bus, and any variety of local, peripheral, and/or independent buses.

As utilized herein, data processing unit(s), such as the data processing unit(s) 702 and/or data processing unit(s) 692, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 704 and computer-readable media 694, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, may include computer storage media and/or communication media. Computer storage media may include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device. The computer storage media can also be referred to herein as computer-readable storage media, non-transitory computer-readable storage media, non-transitory computer-readable medium, or computer storage medium.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 706 may represent, for example, network interface controllers ("NICs") or other types of transceiver devices to send and receive communications over a network. Furthermore, the communication interface(s) 706 may include one or more video cameras and/or audio devices 722 to enable generation of video feeds and/or still images, and so forth. The cameras and other components of the system can be configured to capture images of the user and determine a gaze direction and a gaze target on a screen of a computer.

In the illustrated example, computer-readable media 704 includes a data store 708. In some examples, the data store 708 includes data storage such as a database, data warehouse, or other type of structured or unstructured data storage. In some examples, the data store 708 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 708 may store data for the operations of processes, applications, components, and/or modules stored in computer-readable media 704 and/or executed by data processing unit(s) 702 and/or accelerator(s). For instance, in some examples, the data store 708 may store session data 710 (e.g., session data 636 as shown in FIG. 10), permission data 712, and/or other data. The permission data 712 can associate user identities 181, and thus incoming messages associated with those identities, with an area 182, e.g., a position or defined boundary, within a user interface 101. The permission data 712 can also have an attribute, e.g., write or restricted, defining a permission for a particular user. Restricted users will be prevented from causing a display of messages to the defined area 182 while other users have write permissions to cause a display of their messages within the defined area 182. Such permissions can be also associated with a particular timeline or a portion of an event. For instance, a person may have a particular set of permissions for sending a message to another individual during a portion, such as a presentation, of an event.

The session data 710 can include a total number of participants (e.g., users and/or client computing devices) in a communication session, activity that occurs in the communication session, a list of invitees to the communication session, and/or other data related to when and how the communication session is conducted or hosted. Session data can define a start time and end time and event and also provide a start time and an end time for portions of an event, such as a presentation. The session data may also include contextual data, such as the content that includes video, audio, or other content for rendering and display on one or more of the display screens 629. Hardware data 711 can define aspects of any device, such as a number of display screens of a computer. The contextual data can define any type of activity or status related to the individual users 10A-10F each associated with individual video streams of a plurality of video streams 634. For instance, the contextual data can define a person's level in an organization, how each person's level relates to the level of others, a performance level of a person, or any other activity or status information that can be used to determine a position for a rendering of a person within a virtual environment. The contextual data can also include input data indicating a selection of users who are members of a system. This can include a selection of users who are in a communication session, e.g., an online meeting, and those who are not in a communication session.

Alternately, some or all of the above-referenced data can be stored on separate memories 716 on board one or more data processing unit(s) 702 such as a memory on board a CPU-type processor, a GPU-type processor, an FPGA-type accelerator, a DSP-type accelerator, and/or another accelerator. In this example, the computer-readable media 704 also includes an operating system 718 and application programming interface(s) 711 (APIs) configured to expose the functionality and the data of the device 700 to other devices. Additionally, the computer-readable media 704 includes one or more modules such as the server module 730, the output module 732, and the GUI presentation module 740, although the number of illustrated modules is just an example, and the number may vary. That is, functionality described herein in association with the illustrated modules may be performed by a fewer number of modules or a larger number of modules on one device or spread across multiple devices.

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for controlling positions of messages communicated to a user of a communication system, the method comprising:
    causing a display of a user interface on a computing device of the user, the user interface comprising a rendering of shared content and a display of a plurality of image renderings each representing individual participants of the communication system;
    receiving a message from a remote computer associated with an individual participant;
    processing permission data to select an interface area from a plurality of interface areas, the permission data indicating that the interface area is reserved for a display of the message originating from the remote computer associated with the individual participant and exclusively directed to the computing device associated with the recipient, wherein the interface area comprises an identification of the individual participant, wherein the permission data causes the computing device associated with the recipient to not display group messages directed to the recipient and other participants of the plurality of participants, the permission data further causes the computing device associated with the recipient to not display the display of private messages originating from one or more participants that are not designated as permitted participants; and
    causing a display of the rendering of the message within the interface area comprising the image rendering representative of the individual participant.

2. The method of claim 1, further comprising: modifying the user interface by increasing a size of the interface area displaying the rendering of the message in response to detecting an input defining an eye gaze target having coordinates within the interface area.

3. The method of claim 1, further comprising: modifying the user interface by increasing a quantity of text of the message that is displayed in the user interface, in response to detecting an input defining an eye gaze target having coordinates within the interface area.

4. The method of claim 1, further comprising: modifying the user interface by increasing a size of text used to display the message in response to detecting an input defining an eye gaze target having coordinates within the interface area.

5. The method of claim 1, further comprising: modifying the user interface by causing a display of an updated user interface comprising a thread of messages associated with the message and a text entry field for receiving new messages for the thread of messages, wherein the modification of the user interface is in response to a detection of an eye gaze gesture causing an input defining an eye gaze target having coordinates within the interface area.

6. The method of claim 1, further comprising:
    modifying the user interface by increasing a size of text used to display the message or increasing the size of the interface area in response to determining that an input defining an eye gaze target having coordinates within the interface area that meets a first threshold; and
    modifying the user interface by causing a display of an updated user interface comprising a thread of messages associated with the message and a text entry field for writing new messages to the thread of messages, wherein the updated user interface is displayed in response to determining that the input defining the eye gaze target having coordinates within the interface area meets a second threshold.

7. The method of claim 1, wherein the rendering of the message comprises semi-transparent text that is positioned as an overlay on the image rendering representative of the individual participant.

8. The method of claim 1, wherein an order of the plurality of image renderings is based on a number of messages received from each user associated with individual image renderings, wherein a first remote user is represented by a first rendering of the plurality of image renderings having a first position and a second remote user is represented by a second rendering of the plurality of image renderings having a second position, wherein a first number of messages received from the first remote user is greater than a second number of messages received from the second remote user.

9. The method of claim 1, wherein suppressing the display of group messages directed to the recipient and other participants causes the computing device to restrict the display of the message on the user interface and allow the display of the message on other user interfaces.

10. A system for controlling a display of messages to a user, comprising:
one or more processing units; and
a computer-readable storage medium having encoded thereon computer-executable instructions to cause the one or more processing units to:
cause a display of a user interface comprising a rendering of shared content and a display of a plurality of image renderings each representing individual participants of the communication system;
receive a message from a remote computer associated with an individual participant;
process permission data to select an interface area from a plurality of interface areas, the permission data indicating that the interface area is reserved for a display of the message originating from the remote computer associated with the individual participant and exclusively directed to the computing device associated with the recipient, wherein the interface area comprises an image rendering representative of the individual participant, wherein the permission data causes the computing device associated with the recipient to restrict the display of group messages directed to the recipient and other participants of the plurality of participants, the permission data further causes the computing device associated with the recipient to restrict the display of private messages originating from one or more participants that are not designated as permitted participants; and
cause a display of the rendering of the message within the interface area comprising the image rendering representative of the individual participant.

11. The system of claim 10, wherein the instructions further cause the one or more processing units to modify the user interface by increasing a size of the interface area displaying the rendering of the message in response to detecting an input defining an eye gaze target having coordinates within the interface area.

12. The system of claim 10, wherein the instructions further cause the one or more processing units to modify the user interface by increasing a quantity of text of the message that is displayed in the user interface, in response to detecting an input defining an eye gaze target having coordinates within the interface area.

13. The system of claim 10, wherein the instructions further cause the one or more processing units to modify the user interface by increasing a size of text used to display the message in response to detecting an input defining an eye gaze target having coordinates within the interface area.

14. The system of claim 10, wherein the instructions further cause the one or more processing units to modify the user interface by causing a display of an updated user interface comprising a thread of messages associated with the message and a text entry field for receiving new messages for the thread of messages, wherein the modification of the user interface is in response to a detection of an eye gaze gesture causing an input defining an eye gaze target having coordinates within the interface area.

15. A computer-readable storage device having encoded thereon computer-executable instructions to cause one or more processing units of a system to:
cause a display of a user interface comprising a rendering of shared content and a display of a plurality of image renderings each representing individual participants of the communication system;
receive a message from a remote computer associated with an individual participant;
process permission data to select an interface area from a plurality of interface areas, the permission data indicating that the interface area is reserved for a display of the message originating from the remote computer associated with the individual participant and exclusively directed to the computing device associated with the recipient, wherein the interface area comprises an image rendering representative of the individual participant, wherein the permission data causes the computing device associated with the recipient to not display the display of group messages directed to the recipient and other participants of the plurality of participants, the permission data further causes the computing device associated with the recipient to not display the display of private messages originating from one or more participants that are not designated as permitted participants; and
cause a display of the rendering of the message within the interface area comprising the image rendering representative of the individual participant.

16. The computer-readable storage device of claim 15, wherein the instructions further cause the one or more processing units to modify the user interface by increasing a size of the interface area displaying the rendering of the message in response to detecting an input defining an eye gaze target having coordinates within the interface area.

17. The computer-readable storage device of claim 15, wherein the instructions further cause the one or more processing units to modify the user interface by increasing a quantity of text of the message that is displayed in the user interface, in response to detecting an input defining an eye gaze target having coordinates within the interface area.

18. The computer-readable storage device of claim 15, wherein the instructions further cause the one or more processing units to modify the user interface by increasing a size of text used to display the message in response to detecting an input defining an eye gaze target having coordinates within the interface area.

19. The computer-readable storage device of claim 15, wherein the instructions further cause the one or more processing units to modify the user interface by causing a display of an updated user interface comprising a thread of messages associated with the message and a text entry field for receiving new messages for the thread of messages, wherein the modification of the user interface is in response to a detection of an eye gaze gesture causing an input defining an eye gaze target having coordinates within the interface area.

20. The computer-readable storage device of claim 15, wherein the instructions further cause the one or more processing units to:
modify the user interface by increasing a size of text used to display the message or increasing the size of the interface area in response to determining that an input defining an eye gaze target having coordinates within the interface area that meets a first threshold; and
modify the user interface by causing a display of an updated user interface comprising a thread of messages associated with the message and a text entry field for writing new messages to the thread of messages, wherein the updated user interface is displayed in response to determining that the input defining the eye gaze target having coordinates within the interface area meets a second threshold.

* * * * *